United States Patent
Ikeda et al.

(10) Patent No.: US 12,422,717 B2
(45) Date of Patent: Sep. 23, 2025

(54) OPTICAL ELEMENT

(71) Applicant: Japan Display Inc., Tokyo (JP)

(72) Inventors: Kojiro Ikeda, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/671,439

(22) Filed: May 22, 2024

(65) Prior Publication Data

US 2024/0310679 A1 Sep. 19, 2024

Related U.S. Application Data

(63) Continuation of application No. PCT/JP2022/037414, filed on Oct. 6, 2022.

(30) Foreign Application Priority Data

Nov. 25, 2021 (JP) .................. 2021-191218

(51) Int. Cl.
    *G02F 1/1343* (2006.01)
    *G02F 1/1347* (2006.01)

(52) U.S. Cl.
    CPC .... *G02F 1/134381* (2021.01); *G02F 1/13439* (2013.01); *G02F 1/1347* (2013.01)

(58) Field of Classification Search
    None
    See application file for complete search history.

(56) References Cited

U.S. PATENT DOCUMENTS

| | | |
|---|---|---|
| 2005/0243237 A1 | 11/2005 | Sasuga |
| 2010/0149444 A1 | 6/2010 | Hikmet et al. |
| 2014/0036176 A1 | 2/2014 | Shinkai et al. |
| 2014/0368776 A1 | 12/2014 | Kadomi et al. |
| 2019/0025657 A1 | 1/2019 | Presniakov et al. |

FOREIGN PATENT DOCUMENTS

| | | |
|---|---|---|
| JP | 6-110068 A | 4/1994 |
| JP | 2001-051278 A | 2/2001 |
| JP | 2005-317879 A | 11/2005 |
| JP | 2010-230887 A | 10/2010 |
| JP | 2012-252993 A | 12/2012 |
| JP | 2014-160277 A | 9/2014 |

(Continued)

OTHER PUBLICATIONS

English translation of Office Action issued in related Japanese Patent Application No. 2023-563540, mailed on Nov. 5, 2024. 4 pages.

(Continued)

*Primary Examiner* — Richard H Kim

(74) *Attorney, Agent, or Firm* — K&L Gates LLP

(57) ABSTRACT

An optical element includes at least four liquid crystal cells stacked in sequence. Each of the at least four liquid crystal cells includes a first substrate on which a first transparent electrode and a second transparent electrode each extending in a first direction are alternately arranged in a second direction orthogonal to the first direction, a second substrate on which a third transparent electrode and a fourth transparent electrode each extending in the second direction are alternately arranged in the first direction, and a liquid crystal layer between the first substrate and the second substrate.

10 Claims, 16 Drawing Sheets

(56) References Cited

FOREIGN PATENT DOCUMENTS

WO     WO2021/149407 A1     7/2021

OTHER PUBLICATIONS

English machine translation of Office Action dated Feb. 8, 2025 issued in Korean Appl. No. 10-2024-7016997. 9 pages.
Canadian Office Action from corresponding Canadian Patent Application No. 3,237,857, dated Apr. 4, 2025. 3 pages.
Search Report issued in related International Patent Application No. PCT/JP2022/037414 mailed on Nov. 8, 2022 and English translation of same. 6 pages.
Written Opinion issued in related International Patent Application No. PCT/JP2022/037414 mailed on Nov. 8, 2022. 4 pages.

OPTICAL ELEMENT

CROSS-REFERENCE TO RELATED APPLICATIONS

This application is a Continuation of International Patent Application No. PCT/JP2022/037414, filed on Oct. 6, 2022, which claims the benefit of priority to Japanese Patent Application No. 2021-191218, filed on Nov. 25, 2021, the entire contents of which are incorporated herein by reference.

FIELD

An embodiment of the present invention relates to an optical element that controls a distribution of light emitted from a light source.

BACKGROUND

An optical element which is a so-called liquid crystal lens has been conventionally known in which a change in the refractive index of a liquid crystal is utilized by adjusting a voltage applied to the liquid crystal (for example, see Japanese laid-open patent publication No. 2005-317879, 2010-230887, or 2014-160277). For example, the lighting devices disclosed in the Japanese laid-open patent publications Nos. 2005-317879 and 2010-230877 use a liquid crystal lens to distribute light from a light source in a circular shape. Further, the beam shaping device disclosed in the Japanese laid-open patent publication No. 2014-160277 changes the distribution shape of light by changing patterns of an electrode applied to a liquid crystal.

SUMMARY

An optical element according to an embodiment of the present invention includes at least four liquid crystal cells stacked in sequence. Each of the at least four liquid crystal cells includes a first substrate on which a first transparent electrode and a second transparent electrode each extending in a first direction are alternately arranged in a second direction orthogonal to the first direction, a second substrate on which a third transparent electrode and a fourth transparent electrode each extending in the second direction are alternately arranged in the first direction, and a liquid crystal layer between the first substrate and the second substrate.

An optical element according to an embodiment of the present invention includes a first liquid crystal cell, a second liquid crystal cell, a third liquid crystal cell, and a fourth liquid crystal cell stacked in sequence. Each of the first liquid crystal cell, the second liquid crystal cell, the third liquid crystal cell, and the fourth liquid crystal cell includes a first substrate on which a first transparent electrode and a second transparent electrode each extending in a direction having a first angle with respect to a first direction are alternately arranged in a second direction orthogonal to the first direction, a second substrate on which a third transparent electrode and a fourth transparent electrode each extending in a direction having a second angle with respect to the second direction are alternately arranged in the first direction, and a liquid crystal layer between the first substrate and the second substrate.

An optical element according to an embodiment of the present invention includes a first liquid crystal cell, a second liquid crystal cell, a third liquid crystal cell, and a fourth liquid crystal cell stacked in sequence. Each of the first liquid crystal cell, the second liquid crystal cell, the third liquid crystal cell, and the fourth liquid crystal cell includes a first substrate on which a first transparent electrode extending in a direction having a first angle with respect to a first direction and bent in a direction having a second angle with respect to the first direction and a second transparent electrode extending in the direction having the second angle with respect to the first direction and bent in the direction having the first angle with respect to the first direction are alternatively arranged in a second direction orthogonal to the first direction, a second substrate on which a third transparent electrode extending in a direction having a third angle with respect to the second direction and bent in a direction having a fourth angle with respect to the second direction and a fourth transparent electrode extending in the direction having the fourth angle with respect to the second direction and bent in the direction having the third angle with respect to the second direction are alternatively arranged in the first direction, and a liquid crystal layer between the first substrate and the second substrate.

DESCRIPTION OF EMBODIMENTS

Figure 1:
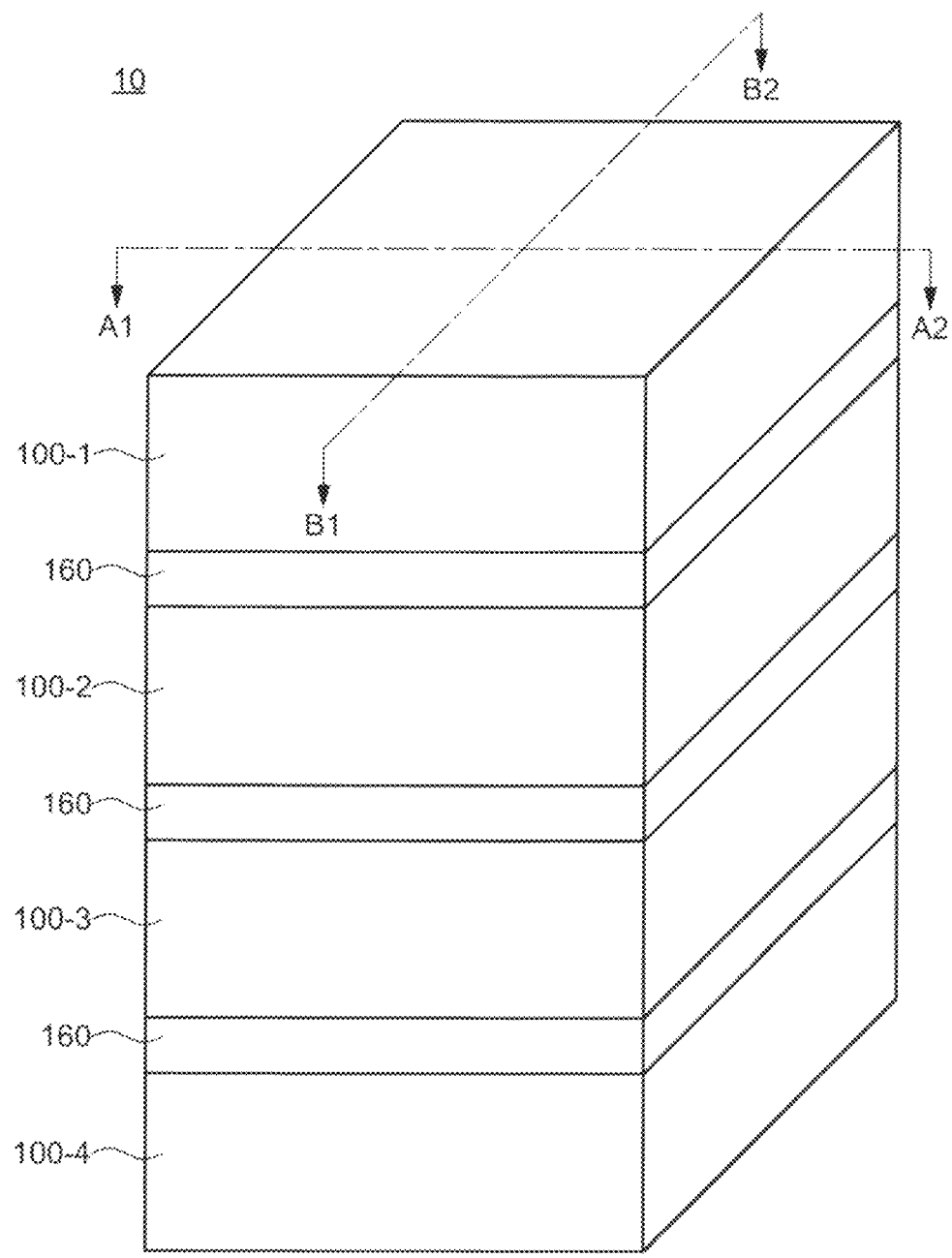
FIG. 1 is a schematic perspective view of an optical element according to an embodiment of the present invention.

An optical element including liquid crystal cells has a problem that, depending on the configuration of the liquid crystal cell, phenomena such as uneven brightness, coloring, or moiré occur, so that light distribution characteristics deteriorate. Therefore, an optical element that can obtain uniform light distribution has been desired.

In view of the above problem, an embodiment of the present invention can provide an optical element that can obtain uniform light distribution.

Hereinafter, each of the embodiments of the present invention is described with reference to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the drawings, the same reference numerals are provided to the same elements as those described previously with reference to preceding figures and repeated explanations may be omitted accordingly.

In the case when a single film is processed to form a plurality of structural bodies, each structural body may have different functions and roles, and the bases formed beneath each structural body may also be different. However, the plurality of structural bodies is derived from films formed in the same layer by the same process and have the same material. Therefore, the plurality of these films is defined as existing in the same layer.

When expressing a mode in which another structure is arranged over a certain structure, in the case where it is simply described as "over", unless otherwise noted, a case where another structure is arranged directly over a certain structure as if in contact with that structure, and a case where another structure is arranged via another structure over a certain structure, are both included.

First Embodiment

An optical element 10 according to an embodiment of the present invention is described with reference to FIGS. 1 to 4.

[1. Configuration of Optical Element 10]

FIG. 1 is a schematic perspective view of the optical element 10 according to an embodiment of the present invention. As shown in FIG. 1, the optical element 10 includes a plurality of liquid crystal cells 100 (a first liquid crystal cell 100-1, a second liquid crystal cell 100-2, a third liquid crystal cell 100-3, and a fourth liquid crystal cell 100-4) stacked in the z-axis direction. Although not shown in the figures, a light source is placed above the first liquid crystal cell 100-1. In other words, the optical element 10 has a structure in which the first liquid crystal cell 100-1, the second liquid crystal cell 100-2, the third liquid crystal cell 100-3, and the fourth liquid crystal cell 100-4 are sequentially stacked in order from the side of the light source. Therefore, light emitted from the light source transmits through the first liquid crystal cell 100-1, the second liquid crystal cell 100-2, the third liquid crystal cell 100-3, and the fourth liquid crystal cell 100-4 in order.

Two adjacent liquid crystal cells 100 of the plurality of liquid crystal cells 100 are bonded to each other via an optical elastic resin layer 160. For example, an adhesive containing a translucent acrylic resin or epoxy resin can be used for the optical elastic resin layer 160.

The optical element 10 can control a distribution of unpolarized light by including at least two liquid crystal cells 100. Therefore, the optical element 10 does not require providing a pair of polarizing plates that, for example, are provided on the front and back surfaces of the liquid crystal display element. Although four liquid crystal cells 100 are shown in FIG. 1, the number of liquid crystal cells 100 included in the optical element 10 is not limited thereto. The number of liquid crystal cells included in the optical element 10 may be greater than or equal to five.

Figure 2A:
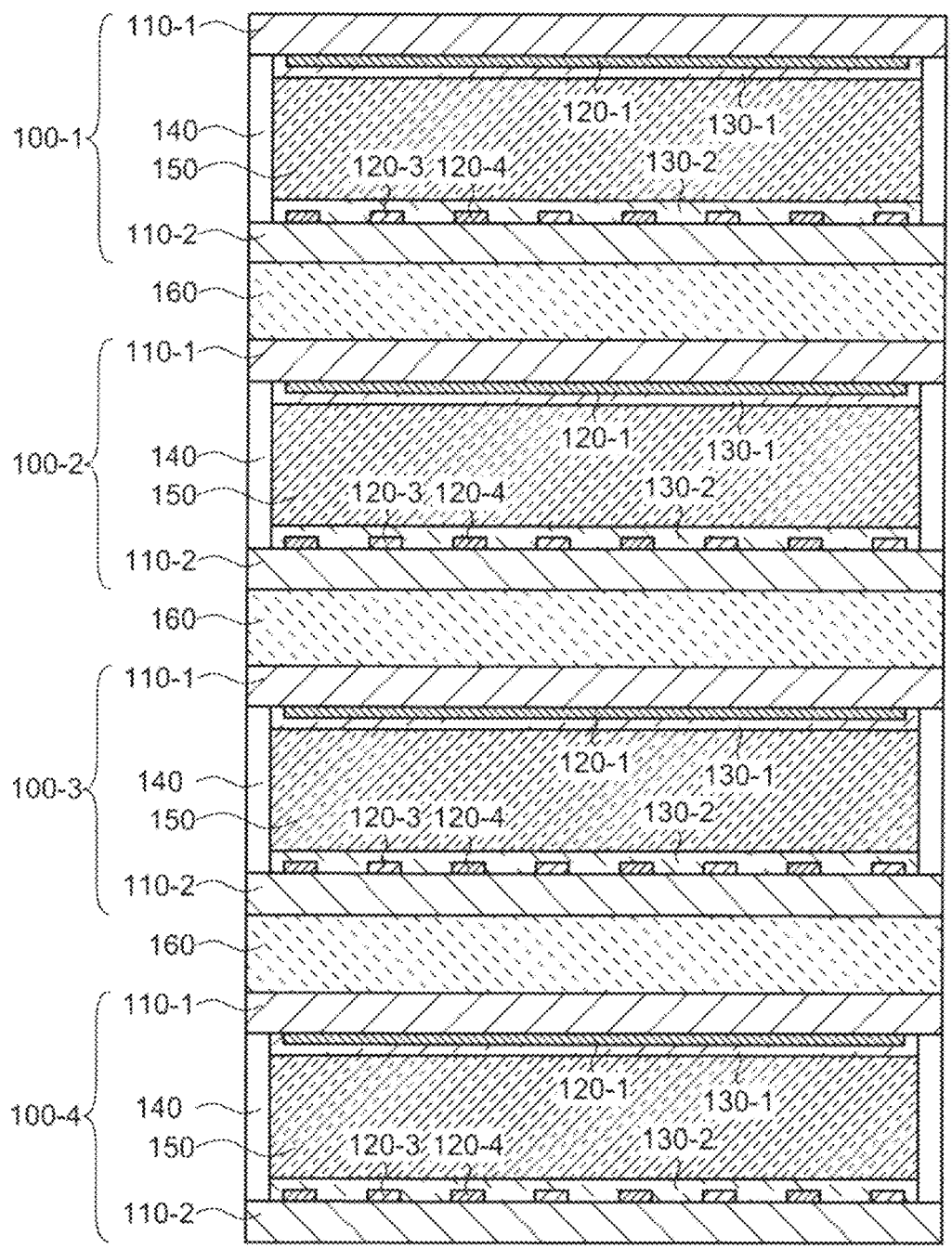
FIG. 2A is a schematic cross-sectional view of an optical element according to an embodiment of the present invention.
Figure 2B:
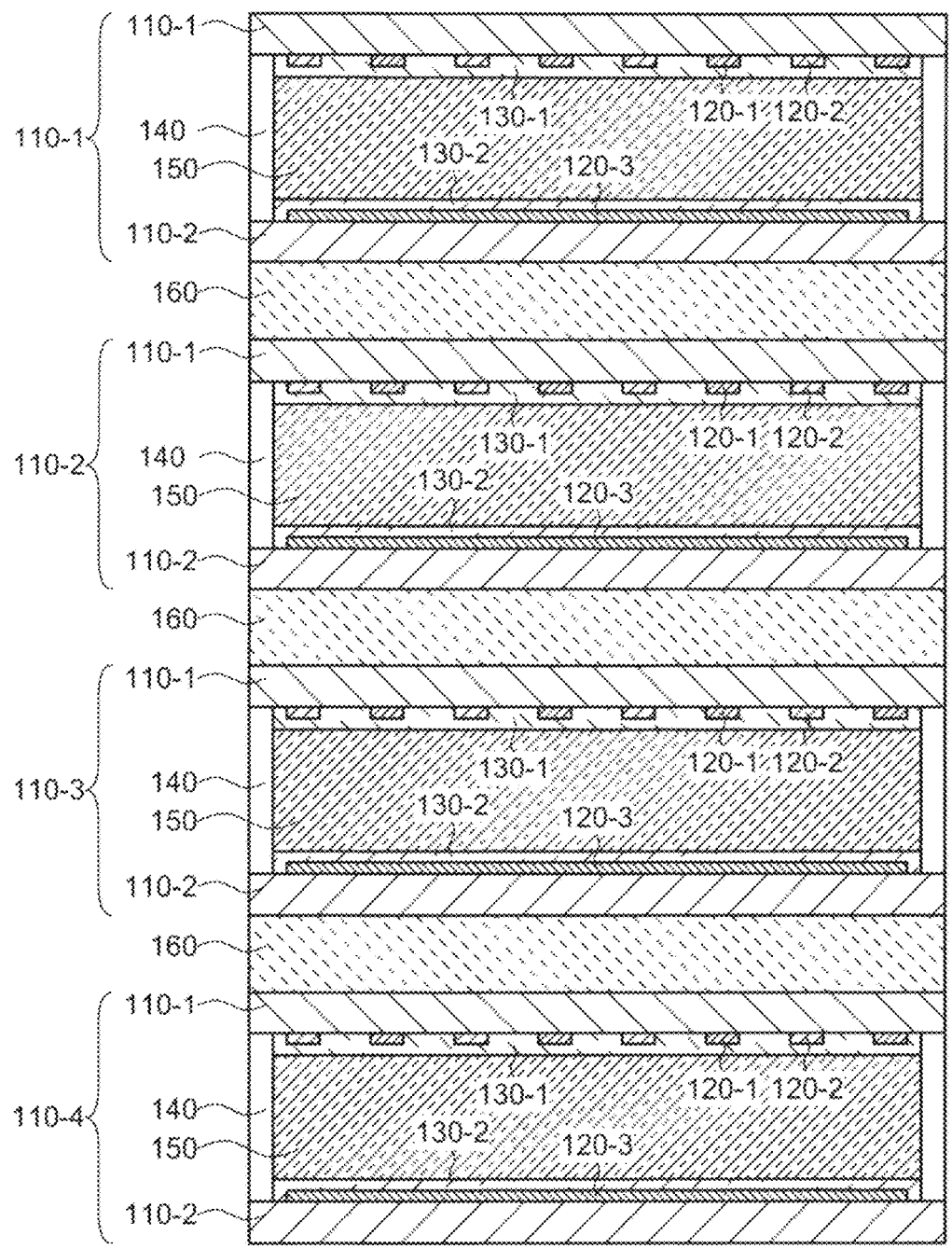
FIG. 2B is a schematic cross-sectional view of an optical element according to an embodiment of the present invention.

FIGS. 2A and 2B are schematic cross-sectional views of the optical element 10 according to an embodiment of the present invention. Specifically, FIG. 2A is a schematic cross-sectional view in a zx plane taken along a line A1-A2 shown in FIG. 1, and FIG. 2B is a schematic cross-sectional view in a yz plane taken along a line B1-B2 shown in FIG. 1. In addition, hereinafter, the x-axis direction and the y-axis direction may be described as a first direction and a second direction, respectively. That is, the second direction is a direction orthogonal to the first direction.

As shown in FIGS. 2A and 2B, each of the plurality of liquid crystal cells 100 includes a first substrate 110-1, a second substrate 110-2, a first transparent electrode 120-1, a second transparent electrode 120-2, a third transparent electrode 120-3, a fourth transparent electrode 120-4, a first alignment film 130-1, a second alignment film 130-2, a sealing member 140, and a liquid crystal layer 150. The first transparent electrode 120-1, the second transparent electrode 120-2, and the first alignment film 130-1 covering the first transparent electrode 120-1 and the second transparent electrode 120-2 are provided on the first substrate 110-1. Further, the third transparent electrode 120-3, the fourth transparent electrode 120-4, and the second alignment film 130-2 covering the third transparent electrode 120-3 and the fourth transparent electrode 120-4 are provided on the second substrate 110-2. The first substrate 110-1 and the second substrate 110-2 are arranged so that the first transparent electrode 120-1 and the second transparent electrode 120-2 on the first substrate 110-1 and the third transparent electrode 120-3 and the fourth transparent electrode 120-4 on the second substrate 110-2 face each other. Further, the first substrate 110-1 and the second substrate 110-2 are bonded to each other via the sealing member 140 that is provided in the peripheral portion of the first substrate 110-1 and the second substrate 110-2. Furthermore, the liquid crystal layer 150 is provided between the first substrate 110-1 and the second substrate 110-2 by sealing a liquid crystal in a space surrounded by the first substrate 110-1 (more specifically, the first alignment film 130-1), the second substrate 110-2 (more specifically, the second alignment film 130-2), and the sealing member 140.

For example, a rigid substrate having light-transmitting properties such as a glass substrate, a quartz substrate, or a sapphire substrate is used as each of the first substrate 110-1 and the second substrate 110-2. Further, a flexible substrate having light-transmitting properties such as a polyimide resin substrate, an acrylic resin substrate, a siloxane resin substrate, or a fluorine resin substrate can also be used as each of the first substrate 110-1 and the second substrate 110-2.

Each of the first transparent electrode 120-1, the second transparent electrode 120-2, the third transparent electrode 120-3, and the fourth transparent electrode 120-4 functions as an electrode for forming an electric field in the liquid crystal layer 150. For example, a transparent conductive material such as indium tin oxide (ITO) or indium zinc oxide (IZO) is used for each of the first transparent electrode 120-1, the second transparent electrode 120-2, the third transparent electrode 120-3, and the fourth transparent electrode 120-4.

The liquid crystal layer 150 can refract transmitted light or change the polarization state of transmitted light according to the alignment state of the liquid crystal molecules. For example, nematic liquid crystal can be used as the liquid crystal of the liquid crystal layer 150. Although a positive liquid crystal is described as the liquid crystal in the present embodiment, a negative liquid crystal can also be adopted by changing the initial alignment directions of the liquid crystal molecules. Further, the liquid crystal preferably contains a chiral agent that imparts twist to the liquid crystal molecules.

Each of the first alignment film 130-1 and the second alignment film 130-2 aligns the liquid crystal molecules in the liquid crystal layer 150 in a predetermined direction. For example, a polyimide resin or the like can be used for each of the first alignment film 130-1 and the second alignment film 130-2. In addition, each of the first alignment film 130-1 and the second alignment film 130-2 may be imparted with alignment properties by an alignment treatment such as a rubbing method or a photo-alignment method. The rubbing method is a method of rubbing the surface of the alignment film in one direction. The photo-alignment method is a method of irradiating an alignment film with linearly polarized ultraviolet rays.

An adhesive material containing epoxy resin, acrylic resin, or the like can be used for the sealing member 140. The adhesive material may be of an ultraviolet curable type or a heat curable type.

Here, extending directions of the transparent electrodes 120 and alignment characteristics of the alignment film 130 are described.

In each of the first liquid crystal cell 100-1, the second liquid crystal cell 100-2, the third liquid crystal cell 100-3, and the fourth liquid crystal cell 100-4, each of the first transparent electrode 120-1 and the second transparent electrode 120-2 includes a plurality of comb-teeth shaped portions extending in the x-axis direction and a connection portion extending in the y-axis direction for connecting these comb-teeth shaped portions, and each of the third transparent electrode 120-3 and the fourth transparent electrode 120-4 includes a plurality of comb-teeth shaped portions extending in the y-axis direction and a connecting portion extending in the x-axis direction for connecting these comb-teeth shaped portions. In addition, hereinafter, for convenience, the description of the transparent electrode 120 may be the description of the comb-teeth shaped portion (that is, a portion of the transparent electrode 120 excluding the connection portion). For example, when the extending direction of the comb-teeth shaped portion of the first transparent electrode 120-1 is the x-axis direction, it may be described that the extending direction of the first transparent electrode 120-1 is the x-axis direction.

Therefore, the extending direction of each of the first transparent electrode 120-1 and the second transparent electrode 120-2 is the x-axis direction, and the extending direction of each of the third transparent electrode 120-3 and the fourth transparent electrode 120-4 is the y-axis direction. The first transparent electrode 120-1 and the second transparent electrode 120-2 have a comb-teeth shape and are arranged alternately in the y-axis direction. Further, the third transparent electrode 120-3 and the fourth transparent electrode 120-4 have a comb-teeth shape and are arranged alternately in the x-axis direction.

As described above, the extending directions of the first transparent electrode 120-1, the second transparent electrode 120-2, the third transparent electrode 120-3, and the fourth transparent electrode 120-4 match or substantially match between the four liquid crystal cells 100. That is, the optical element 10 is not configured such that two of the four liquid crystal cells 100 have to be rotated by 90 degrees with respect to the other two liquid crystal cells 100. The optical element 10 has a structure in which the four liquid crystal cells 100 are stacked as they are, independent of the rotation of each of the liquid crystal cells 100.

In addition, although the extending direction of the first transparent electrode 120-1 and the second transparent electrode 120-2 is orthogonal to the extending direction of the third transparent electrode 120-3 and the fourth transparent electrode 120-4, the case where the angles deviate from an orthogonal direction by about ±10 degrees may also be described as orthogonal in this specification.

In each of the first liquid crystal cell 100-1, the second liquid crystal cell 100-2, the third liquid crystal cell 100-3, and the fourth liquid crystal cell 100-4, the first alignment film 130-1 has an alignment property of aligning the long axes of the liquid crystal molecules in the y-axis direction and the second alignment film 130-2 has an alignment property of aligning the long axes of the liquid crystal molecules in the x-axis direction. In order to impart such alignment properties to the alignment films 130, a rubbing treatment is performed on the first alignment film 130-1 in the y-axis direction and a rubbing treatment is performed on the second alignment film 130-2 in the x-axis direction.

As described above, the first liquid crystal cell 100-1, the second liquid crystal cell 100-2, the third liquid crystal cell 100-3, and the fourth liquid crystal cell 100-4 have the same basic structure. Here, the properties of light transmitted through the liquid crystal cell 100 are described with reference to FIGS. 3A and 3B.

Figure 3A:
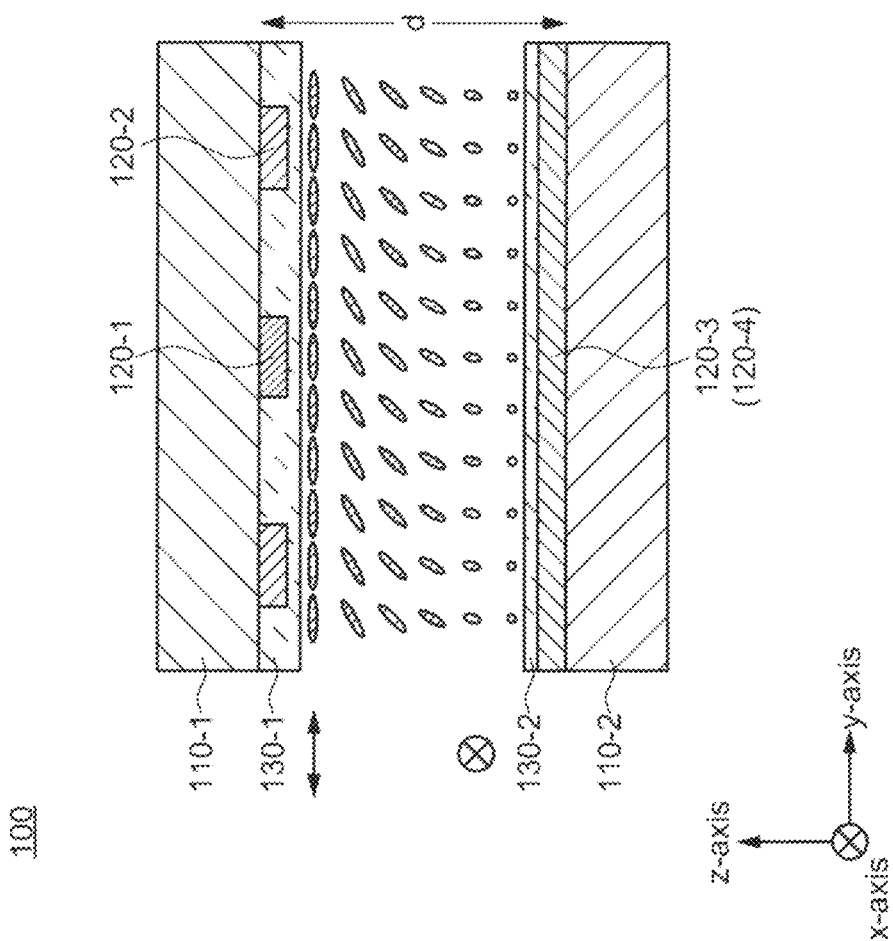
FIG. 3A is a schematic cross-sectional view illustrating alignment directions of liquid crystal molecules in a liquid crystal layer of a liquid crystal cell and properties of light transmitting through the liquid crystal cell of an optical element according to an embodiment of the present invention.
Figure 3B:
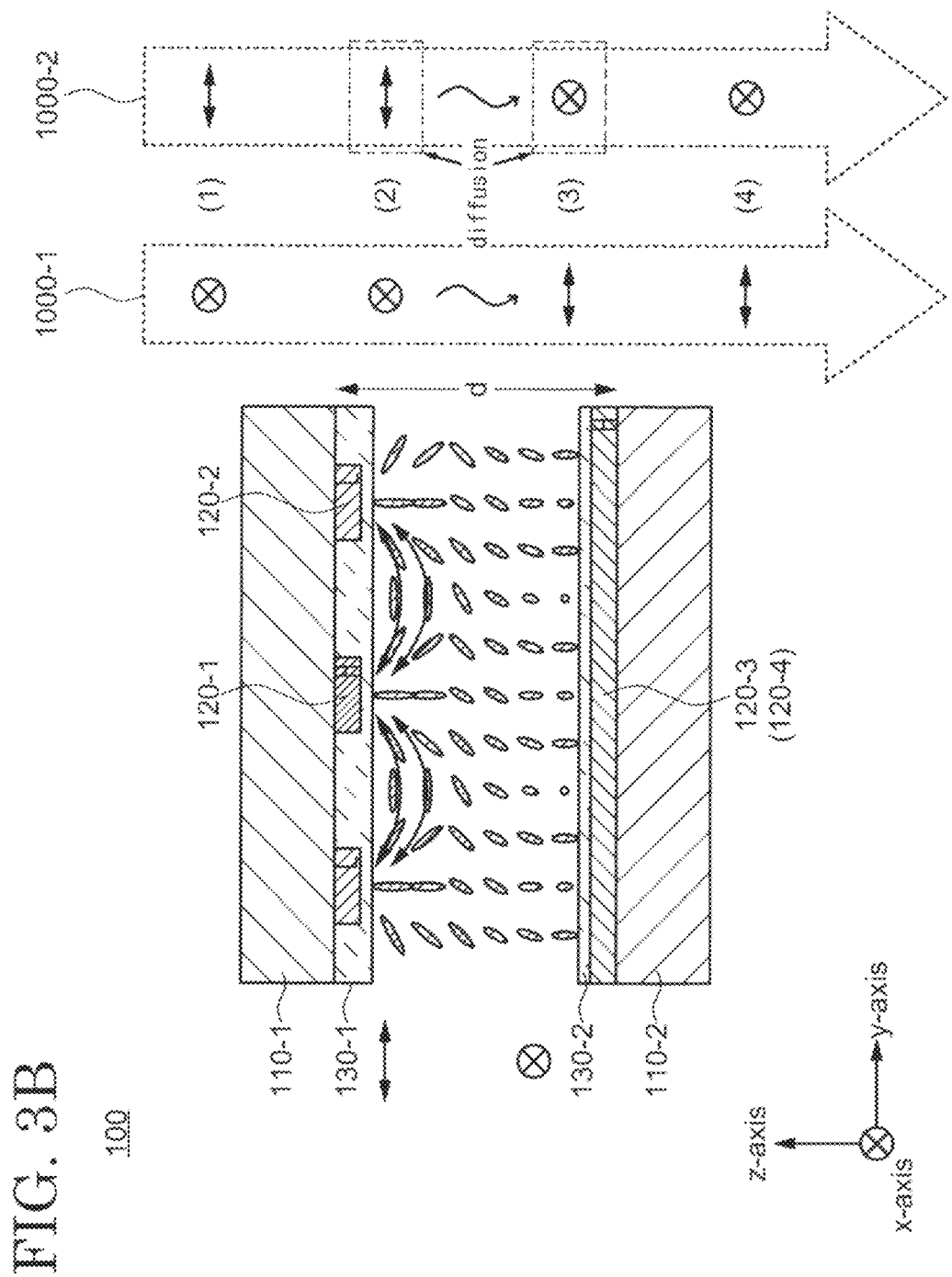
FIG. 3B is a schematic cross-sectional view illustrating alignment directions of liquid crystal molecules in a liquid crystal layer of a liquid crystal cell and properties of light transmitting through the liquid crystal cell of an optical element according to an embodiment of the present invention.

FIGS. 3A and 3B are schematic cross-sectional views illustrating alignment directions of the liquid crystal molecules in the liquid crystal layer 150 of the liquid crystal cell 100 and the properties of light transmitted through the liquid crystal cell 100 of the optical element 10 according to an embodiment of the present invention. Specifically, FIG. 3A shows the liquid crystal cell 100 in a state where no voltages are applied to the transparent electrodes 120, and FIG. 3B shows the liquid crystal cell 100 in a state where voltages are applied to the transparent electrodes 120.

FIG. 3A shows the liquid crystal cell 100 in a state where no voltages are applied to the transparent electrodes 120. As shown in FIG. 3A, the liquid crystal molecules on the first alignment film 130-1 are aligned with their long axes along the y-axis direction. In other words, the alignment direction (the initial alignment direction) of the liquid crystal molecules closer to the first substrate 110-1 is the y-axis direction. On the other hand, the liquid crystal molecules on the second alignment film 130-2 are aligned with their long axes along the x-axis direction. In other words, the alignment direction (the initial alignment direction) of the liquid crystal molecules closer to the second substrate 110-2 is the x-axis direction. Therefore, the liquid crystal molecules in the liquid crystal layer 150 are aligned so as to be twisted by 90 degrees in the z-axis direction as the liquid crystal molecules move from the first substrate 110-1 to the second substrate 110-2. In this case, the polarization plane (the polarization axis or the direction of the polarization component) of the light transmitted through the liquid crystal layer 150 is rotated by 90 degrees according to the alignment direction of the liquid crystal molecules. That is, the light transmitted through the liquid crystal layer 150 has optical rotation.

FIG. 3B shows the liquid crystal cell 100 in a state where voltages are applied to the transparent electrodes 120. For example, a high voltage (H) is applied to the first transparent electrode 120-1 and the third transparent electrode 120-3, and a low voltage (L) is applied to the second transparent electrode 120-2 and the fourth transparent electrode 120-4. That is, voltages are applied so that a potential difference is generated between adjacent two transparent electrodes 120. In addition, hereinafter, the electric field generated between adjacent two transparent electrodes 120 may be referred to as a lateral electric field.

The liquid crystal molecules closer to the first substrate 110-1 are aligned in a convex arc shape along the y-axis direction with respect to the first substrate 110-1 by the influence of the lateral electric field between the first transparent electrode 120-1 and the second transparent electrode 120-2. Further, the liquid crystal molecules closer to the second substrate 110-2 are aligned in a convex arc shape along the x-axis direction with respect to the second substrate 110-2 by the influence of the lateral electric field between the third transparent electrode 120-3 and the fourth transparent electrode 120-4. In contrast, since the cell gap d, which is the distance between the first substrate 110-1 and the second substrate 110-2, is sufficiently large compared to the distance between the adjacent transparent electrodes 120 on the substrate (for example, 10 µm≤d≤30 µm), the liquid crystal molecules in the center between the first substrate 110-1 and the second substrate 110-2 are hardly changed from the initial alignment by any lateral electric field. In addition, as described above, since the first substrate 110-1 and the second substrate 110-2 are sufficiently far apart, the lateral electric field between the first transparent electrode 120-1 and the second transparent electrode 120-2 on the first substrate 110-1 does not affect the alignment of the liquid crystal molecules on the side of the second substrate 110-2, or is negligibly small. Similarly, the lateral electric field between the third transparent electrode 120-3 and the fourth transparent electrode 120-4 on the second substrate 110-2 does not affect the alignment of the liquid crystal molecules on the side of the first substrate 110-1, or is negligibly small.

Light emitted from the light source has a polarization component in the x-axis direction (hereinafter, referred to as "P-polarization component") and a polarization component in the y-axis direction (hereinafter, referred to as "S-polarization component"). However, for convenience, the polarization component of the light is divided into the P-polarization component and the S-polarization component in the following description. That is, the light emitted from the light source includes a first polarized light 1000-1 having the P-polarization component and a second polarized light 1000-2 having the S-polarization component (see (1) in FIG. 3B).

In FIG. 3B, since the P-polarization component of the first polarized light 1000-1 incident on the liquid crystal cell 100 is different from the alignment direction of the liquid crystal molecules on the side of the first substrate 110-1, the first polarized light 1000-1 is not diffused (see (2) in FIG. 3B). When the first polarized light 1000-1 travels from the first substrate 110-1 to the second substrate 110-2, the first polarized light 1000-1 undergoes optical rotation in the process of passing through the liquid crystal layer 150, and its polarized light component changes from the P-polarization component to the S-polarization component. Since the S-polarization component of the first polarized light 1000-1 is different from the alignment direction of the liquid crystal molecules on the side of the second substrate 110-2, the first polarized light 1000-1 is not diffused (see (3) in FIG. 3B). Further, the first polarized light 1000-1 emitted from the liquid crystal cell 100 has the S polarization component (see (4) in FIG. 3B).

On the other hand, since the S polarized light component of the second polarized light 1000-2 incident on the liquid crystal cell 100 is the same as the alignment direction of the liquid crystal molecules on the side of the first substrate 110-1, the second polarized light 1000-2 is diffused in the y-axis direction according to the refractive index distribution of the liquid crystal molecules on the side of the first substrate 110-1 (see (2) in FIG. 3B). When the second polarized light 1000-2 travels from the first substrate 110-1 to the second substrate 110-2, the second polarized light 1000-2 undergoes optical rotation in the process of passing through the liquid crystal layer 150, and its polarized light component changes from the S-polarization component to the P-polarization component. Since the P-polarization component of the second polarized light 1000-2 is the same as the alignment direction of the liquid crystal molecules on the side of the second substrate 110-2, the second polarized light 1000-2 is diffused in the x-axis direction according to the refractive index distribution of the liquid crystal molecules on the side of the second substrate 110-2 (see (4) in FIG. 3B).

As can be seen from the above, light can be diffused in a predetermined direction by using the direction of the lateral electric field generated by the transparent electrodes 120 and the optical rotation and the refractive index distribution of the liquid crystal molecules in the liquid crystal cell 100. In the optical element 10, it is possible to control the diffusion of light transmitted through each liquid crystal cell 100 by using the plurality of the liquid crystal cells 100 to form various light distribution shapes. In addition, the light distribution shapes can also be controlled by the magnitude of the voltage applied to the transparent electrode 120.

Figure 4:
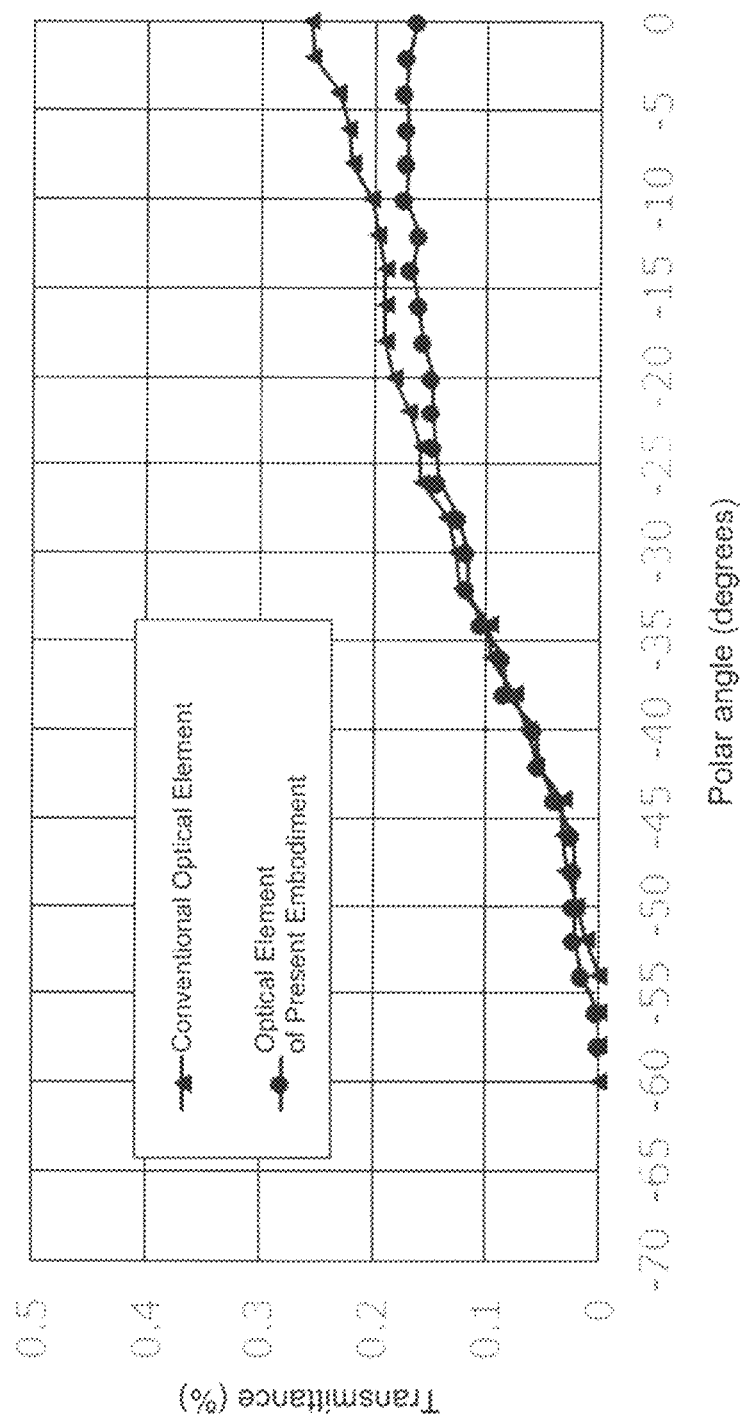
FIG. 4 is a graph showing the transmittance of an optical element according to an embodiment of the present invention and a conventional optical element.

Here, a comparison of light distribution characteristics between the optical element 10 of the present embodiment and a conventional optical element is shown in FIG. 4. In addition, the conventional optical element described here has a structure in which the third liquid crystal cell 100-3 and the fourth liquid crystal cell 100-4 of the optical element 10 are rotated by 90 degrees with respect to the first liquid crystal cell 100-1 and the second liquid crystal cell 100-2.

FIG. 4 is a graph showing the transmittance of the optical element 10 according to an embodiment of the present invention and the conventional optical element. Specifically, the graph of FIG. 4 shows the transmittance versus a polar angle. The transmittance of the optical element 10 and the conventional optical element was measured using an LCD evaluation device (LCD-5200 manufactured by Otsuka Electronics Co., Ltd.). The direction of the polar angle of 0 degrees is perpendicular to the second substrate 110-2 of the fourth liquid crystal cell 100-4. The transmittance at a polar angle of 0 degrees when no voltage was applied to the transparent electrode 120 was set as 100%, and the transmittance when a voltage was applied to the transparent electrode 120 was measured. In addition, the absolute value of the polar angle at which the transmittance is half of the transmittance at a polar angle of 0 degrees is defined as the half-width at half maximum.

The half width at half maximum of the optical element 10 is 38 degrees. On the other hand, the half width at half maximum of the conventional optical element is 29 degrees. It is confirmed that the optical element 10 has a larger half-width at half maximum than the conventional optical element because the diffusion of light becomes uniform in the liquid crystal cell 100.

As described above, in the optical element 10 according to an embodiment of the present invention, the diffusion of light can become uniform. Therefore, uniform light distribution can be obtained in the optical element 10.

Modification 1 of First Embodiment

An optical element 10A, which is a modified example of the optical element 10 according to an embodiment of the present invention, is described with reference to FIG. 5. Hereinafter, when a configuration of the optical element 10A is similar to the configuration of the optical element 10, the description of the configuration of the optical element 10A may be omitted.

Figure 5:
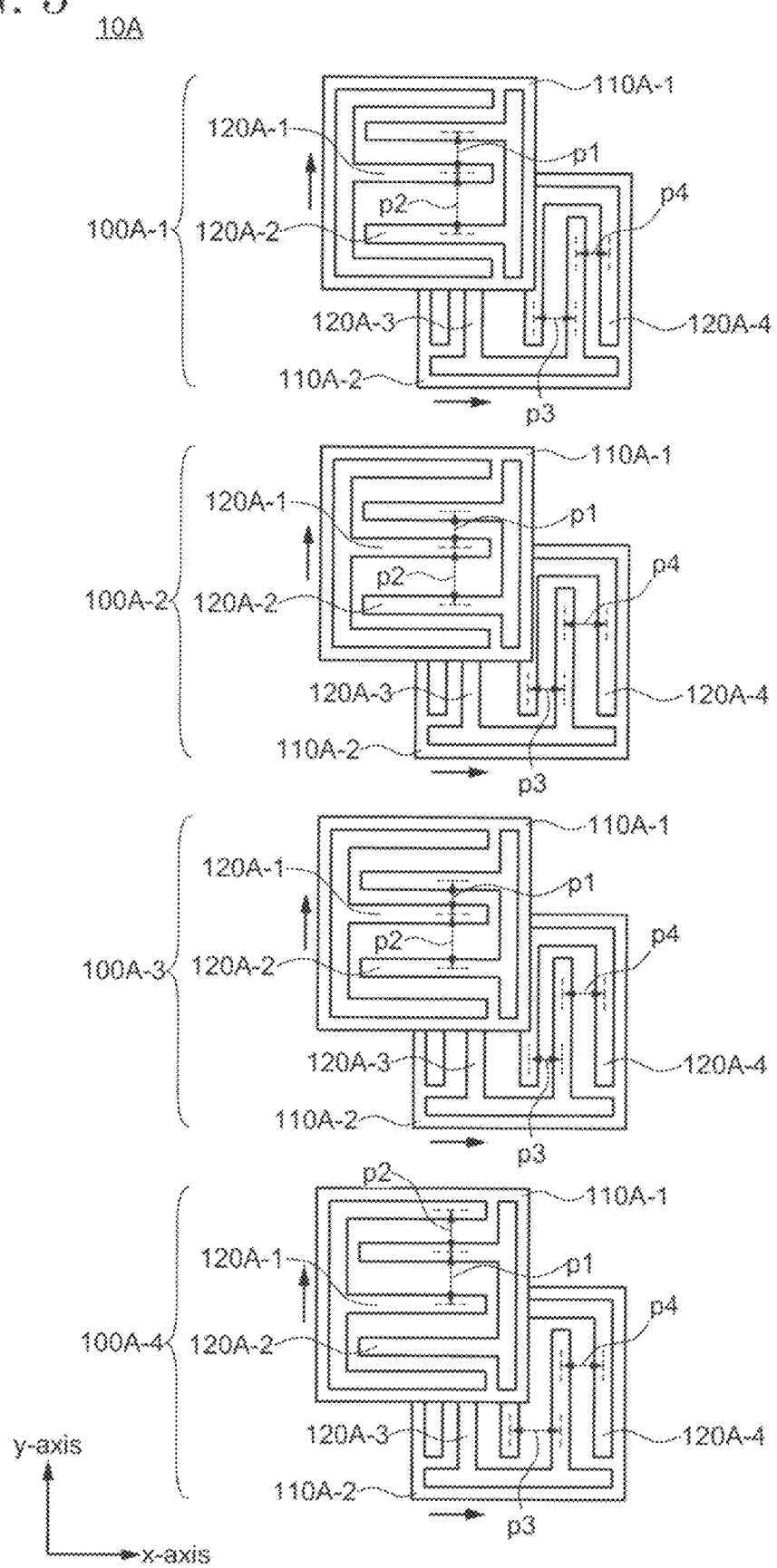
FIG. 5 is a schematic diagram illustrating a configuration of a transparent electrode of a liquid crystal cell of an optical element according to an embodiment of the present invention.

FIG. 5 is a schematic diagram illustrating a configuration of a transparent electrode 120A of a liquid crystal cell 100A of the optical element 10A according to an embodiment of the present invention. The optical element 10A includes four liquid crystal cells 100A. That is, in the optical element 10A, a first liquid crystal cell 100A-1, a second liquid crystal cell 100A-2, a third liquid crystal cell 100A-3, and a fourth liquid crystal cell 100A-4 are sequentially stacked. Each of the first liquid crystal cell 100A-1, the second liquid crystal cell 100A-2, the third liquid crystal cell 100A-3, and the fourth liquid crystal cell 100A-4 includes a first substrate 110A-2 provided with a first transparent electrode 120A-1 and a second transparent electrode 120A-2 each extending in the x-axis direction and a second substrate 110A-2 provided with a third transparent electrode 120A-3 and a fourth transparent electrode 120A-4 each extending in the y-axis direction. In addition, an arrow shown along each substrate indicates the alignment direction (the initial alignment direction) of the alignment film on the substrate (A similar configuration is applied in FIG. 6, FIG. 7, FIG. 9, FIG. 10, FIG. 11, FIG. 13, and FIG. 14).

A first electrode pattern and a second electrode pattern for driving the liquid crystal are formed on the first substrate 110A-1 and the second substrate 110A-2, respectively. The first electrode pattern is a pattern in which the first transparent electrode 120A-1 and the second transparent electrode 120A-2 are alternately arranged in the y-axis direction. The second electrode pattern is a pattern in which the third transparent electrode 120A-3 and the fourth transparent electrode 120A-4 are alternately arranged in the x-axis direction.

The first electrode pattern of the liquid crystal cell 100A includes at least two inter-electrode pitches (inter-electrode pitches p1 and p2 in FIG. 5) which are formed between the first transparent electrode 120A-1 and the second transparent electrode 120A-2 (the distances between the center line of the first transparent electrode 120A-1 and the center line of the second transparent electrode 120A-2 in the y-axis direction). Further, the second electrode pattern of the liquid crystal cell 100A includes at least two inter-electrode pitches (inter-electrode pitches p3 and p4 in FIG. 5) which are formed between the third transparent electrode 120A-3 and the fourth transparent electrode 120A-4 (the distances between the center line of the third transparent electrode 120A-3 and the center line of the fourth transparent electrode 120A-4 in the x-axis direction). In addition, each electrode pattern may have a configuration including two or more inter-electrode pitches. That is, a configuration in which each of the first electrode pattern and the second electrode pattern has different inter-electrode pitches between all adjacent two electrodes can also be adopted. In this way, a configuration in which each electrode pattern includes at least two or more inter-electrode pitches is referred to as an unequal pitch.

Further, a configuration in which the first electrode pattern and the second electrode pattern are the same can also be adopted.

The optical element 10A may have a configuration in which the four liquid crystal cells 100A have the same first electrode pattern and second electrode pattern, or a configuration in which one liquid crystal cell 100A of the four liquid crystal cells 100A has the same first electrode pattern and second electrode pattern as the other liquid crystal cell 100A of the four liquid crystal cells 100A. Between the one liquid crystal cell 100A and the other liquid crystal cell 100A, one of the first electrode pattern and the second electrode pattern may be the same as the other of the first electrode pattern and the second electrode pattern and may be different from the other of the first electrode pattern and the second electrode pattern. Needless to say, the optical element 10A may have a configuration in which the four liquid crystal cells 100A have a different first electrode pattern and second electrode pattern from each other. However, when the four liquid crystal cells 100A have a different first electrode pattern and second electrode pattern different from each other, it is possible to further suppress the light intensity of a specific wavelength becoming stronger because the diffusion state in each liquid crystal cell 100A changes. Therefore, it is preferable that the four liquid crystal cells 100A have a different first electrode pattern and second electrode pattern from each other. That is, it is preferable that the electrode patterns of the four liquid crystal cells 100A have all different unequal pitches.

As described above, in the optical element 10A according to an embodiment of the present invention, it is possible to suppress the light intensity of a specific wavelength becoming stronger. Therefore, a uniform light distribution with suppressed coloring can be obtained in the optical element 10A.

Modification 2 of First Embodiment

An optical element 10B, which is another modified example of the optical element 10 according to an embodiment of the present invention, is described with reference to FIG. 6. Hereinafter, when a configuration of the optical element 10B is similar to the configuration of the optical element 10, the description of the configuration of the optical element 10B may be omitted.

Figure 6:
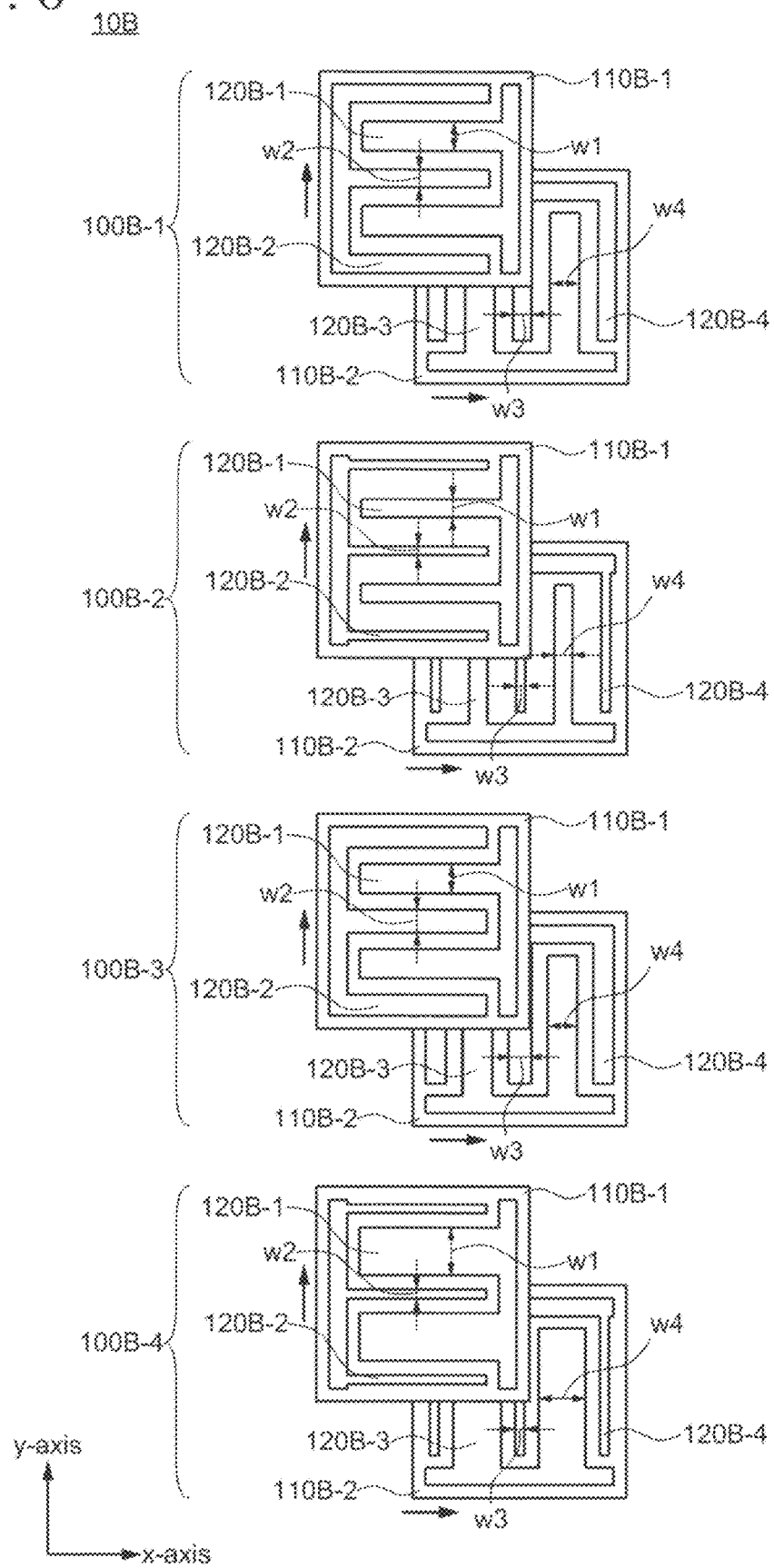
FIG. 6 is a schematic diagram illustrating a configuration of a transparent electrode of a liquid crystal cell of an optical element according to an embodiment of the present invention.

FIG. 6 is a schematic diagram illustrating a configuration of a transparent electrode 120B of a liquid crystal cell 100B of the optical element 10B according to an embodiment of the present invention. The optical element 10B includes four liquid crystal cells 100B. That is, in the optical element 10B, a first liquid crystal cell 100B-1, a second liquid crystal cell 100B-2, a third liquid crystal cell 100B-3, and a fourth liquid crystal cell 100B-4 are sequentially stacked. Each of the first liquid crystal cell 100B-1, the second liquid crystal cell 100B-2, the third liquid crystal cell 100B-3, and the fourth liquid crystal cell 100B-4 includes a first substrate 110B-1 provided with a first transparent electrode 120B-1 and a second transparent electrode 120B-2 each extending in the x-axis direction, and a second substrate 110B-2 provided with a third transparent electrode 120B-3 and a fourth transparent electrode 120B-4 each extending in the y-axis direction.

A first electrode pattern and a second electrode pattern for driving the liquid crystal are formed on the first substrate 110B-1 and the second substrate 110B-2, respectively. The first electrode pattern is a pattern in which the first transparent electrode 120B-1 and the second transparent electrode 120B-2 are alternately arranged in the y-axis direction. The second electrode pattern is a pattern in which the third transparent electrode 120B-3 and the fourth transparent electrode 120B-4 are alternately arranged in the x-axis direction.

In the first electrode pattern of the liquid crystal cell 100B, the width w1 of the comb-teeth shaped portion of at least the first transparent electrode 120B-1 is different from the width w2 of the comb-teeth shaped portion of the second transparent electrode 120B-2. Further, in the second electrode pattern of the liquid crystal cell 100B, the width w3 of the comb-teeth shaped portion of the third transparent electrode 120B-3 is different from the width w4 of the comb-teeth shaped portion of the fourth transparent electrode 120B-4. The width w1 of the comb-teeth shaped portion of the first transparent electrode 120B-1 may be the same as the width w3 of the comb-teeth shaped portion of the third transparent electrode 120B-3 and the width w4 of the comb-teeth shaped portion of the fourth transparent electrode 120B-4, or may be different from the width w3 of the comb-teeth shaped portion of the third transparent electrode 120B-3 and the width w4 of the comb-teeth shaped portion of the fourth transparent electrode 120B-4. Further, the width w3 of the comb-teeth shaped portion of the third transparent electrode 120B-3 may be the same as the width w1 of the comb-teeth shaped portion of the first transparent electrode 120B-1 and the width w2 of the comb-teeth shaped portion of the second transparent electrode 120B-2, or may be different from the width w1 of the comb-teeth shaped portion of the first transparent electrode 120B-1 and the width w2 of the comb-teeth shaped portion of the second transparent electrode 120B-2. In addition, the widths w1 of the plurality of comb-teeth shaped portions of the first transparent electrode 120B-1 may be the same, or may be different from each other. The widths w2 of the plurality of comb-teeth shaped portions of the second transparent electrode 120B-2, the widths w3 of the plurality of comb-teeth shaped portions of the third transparent electrode 120B-3, and the widths w4 of the plurality of comb-teeth shaped portions of the fourth transparent electrode 120B-4 are the same configuration as the widths w1. Further, the distances between the adjacent first transparent electrode 120B-1 and second transparent electrode 120B-2 may be all the same, some of them may be the same, or all of them may be different from each other. When the width w1 of the comb-teeth shaped portion of the first transparent electrode 120B-1 is different from the width w2 of the comb-teeth shaped portion of the second transparent electrode 120B-2, and/or the distances between the comb-teeth shaped portion of the first transparent electrode 120B-1 and the comb-teeth shaped portion of the second transparent electrode 120B-2 are different from each other, unequal pitches are realized in the first electrode pattern. The second electrode pattern has the same configuration as the first electrode pattern.

The optical element 10B has a configuration in which the four liquid crystal cells 100B have a different first electrode pattern and second electrode pattern from each other. For example, the width w1 of the first transparent electrode 120B-1 of the first liquid crystal cell 100B-1 is different from the width w1 of the first transparent electrode 120B-1 of each of the second liquid crystal cell 100B-2, the third liquid crystal cell 100B-3, and the fourth liquid crystal cell 100B-4. In this case, since the diffusion state in each liquid crystal cell 100B changes, it is possible to suppress the light intensity of a specific wavelength becoming stronger.

As described above, in the optical element 10B according to an embodiment of the present invention, it is possible to suppress the light intensity of a specific wavelength becoming stronger. Therefore, uniform light distribution with suppressed coloring can be obtained in the optical element 10B.

Second Embodiment

An optical element 20 according to an embodiment of the present invention is described with reference to FIGS. 7 and 8. Hereinafter, when a configuration of the optical element 20 is similar to the configuration of the optical element 10, the description of the configuration of the optical element 20 may be omitted.

Figure 7:
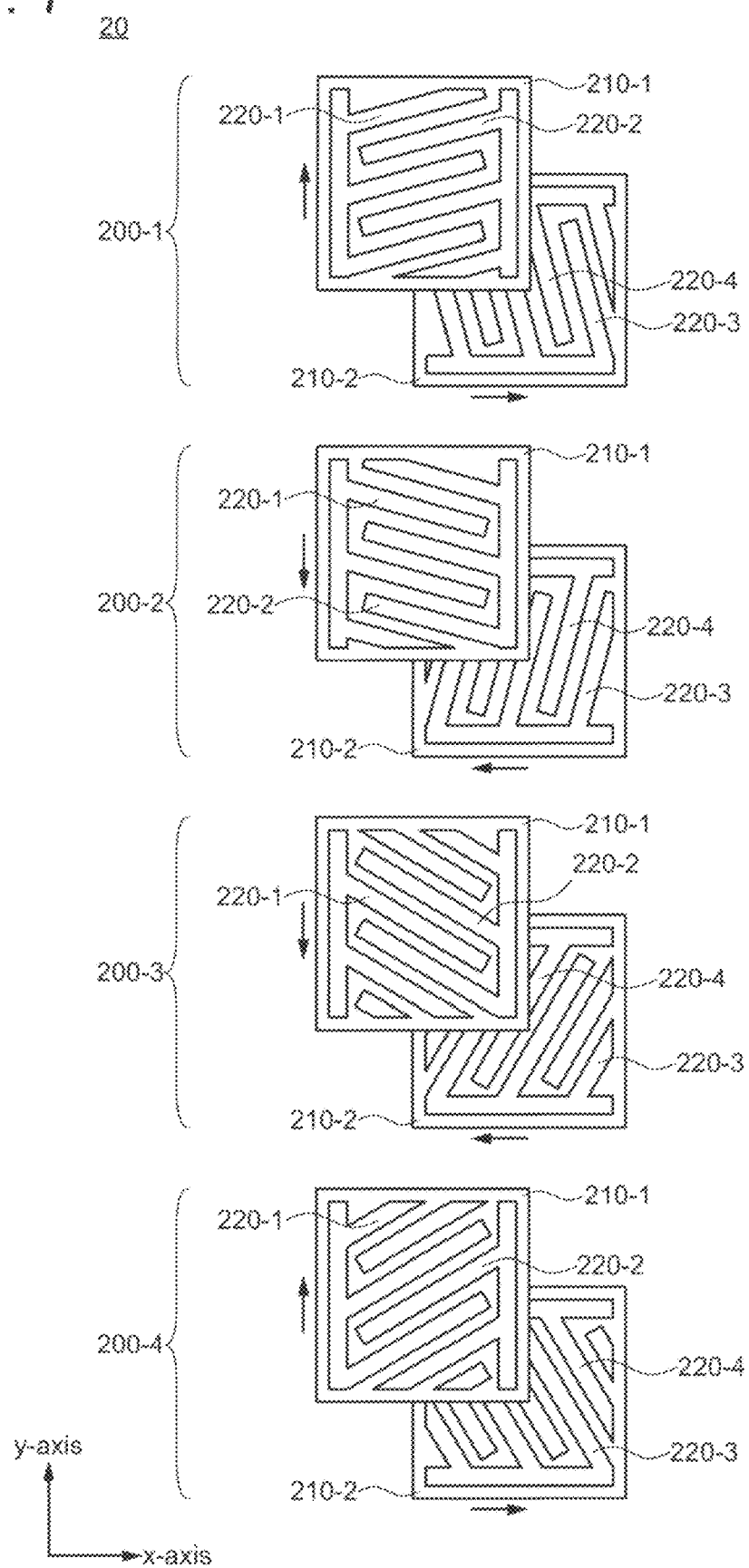
FIG. 7 is a schematic diagram illustrating a configuration of a transparent electrode of a liquid crystal cell of an optical element according to an embodiment of the present invention.

FIG. 7 is a schematic diagram illustrating a configuration of a transparent electrode 220 of a liquid crystal cell 200 of the optical element 20 according to an embodiment of the present invention. The optical element 20 includes four liquid crystal cells 200. That is, in the optical element 20, a first liquid crystal cell 200-1, a second liquid crystal cell 200-2, a third liquid crystal cell 200-3, and a fourth liquid crystal cell 200-4 are sequentially stacked. Each of the first liquid crystal cell 200-1, the second liquid crystal cell 200-2, the third liquid crystal cell 200-3, and the fourth liquid crystal cell 200-4 includes a first substrate 210-1 provided with a first transparent electrode 220-1 and a second transparent electrode 220-2, and a second substrate 210-2 provided with a third transparent electrode 220-3 and a fourth transparent electrode 220-4.

A first electrode pattern and a second electrode pattern for driving the liquid crystal are formed on the first substrate 210-1 and the second substrate 210-2, respectively. Here, the first electrode pattern and the second electrode pattern of the liquid crystal cell 200 are described in detail with reference to FIG. 8.

Figure 8:
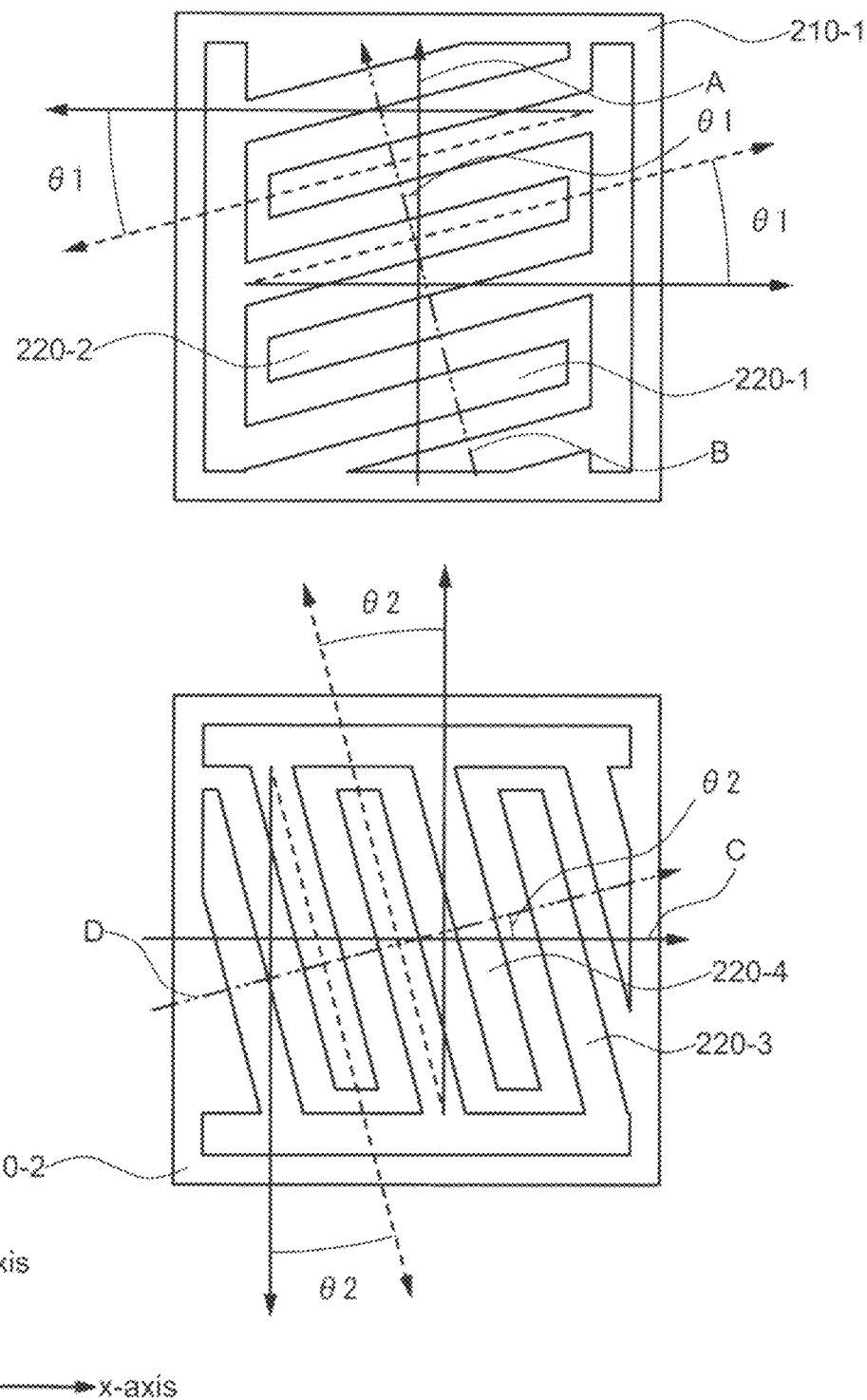
FIG. 8 is a schematic diagram illustrating configurations of a first electrode pattern and a second electrode pattern of a liquid crystal cell of an optical element according to an embodiment of the present invention.

FIG. 8 is a schematic diagram illustrating configurations of the first electrode pattern and the second electrode pattern of the liquid crystal cell 200 of the optical element 20 according to an embodiment of the present invention. The first electrode pattern is a pattern in which the first transparent electrode 220-1 and the second transparent electrode 220-2 each extending in a direction having a first angle θ1 with respect to the x-axis direction are arranged alternately in the y-axis direction. The second electrode pattern is a pattern in which the third transparent electrode 220-3 and the fourth transparent electrode 220-4 each extending in a direction having a second angle θ2 with respect to the y-axis direction are arranged alternately in the x-axis direction. The first angle θ1 may be the same as the second angle θ2. In this case, the transparent electrode 220 on the first substrate 110-1 and the transparent electrode 220 on the second substrate 110-2 are orthogonal to each other in a plan view. Needless to say, the first angle θ1 and the second angle θ2 may be different from each other. Each of the first angle θ1 and the second angle θ2 is greater than or equal to −5 degrees and less than or equal to +5 degrees, preferably greater than or equal to −3 degrees and less than or equal to +3 degrees. In addition, although there are differences in the first angle θ1 and the second angle θ2, the four liquid crystal cells 200 have basically the same extending directions of the first transparent electrode 220-1, the second transparent electrode 220-2, the third transparent electrode 220-3, and the fourth transparent electrode 220-4. That is, the optical element 20 is not configured such that two of the four liquid crystal cells 200 have to be rotated by 90 degrees with respect to the other two liquid crystal cells 200. The optical element 20 has a structure in which the four liquid crystal cells 200 are stacked, independent of the rotation of each liquid crystal cell 200.

Further, an arrow A shown in FIG. 8 indicates the initial orientation direction of the first alignment film 130-1 with respect to the first electrode pattern of the first substrate 210-1. As shown by the arrow A, the initial alignment direction is parallel to the y-axis direction. In addition, the direction of the initial orientation can be arbitrarily set within the range from the y-axis direction to a direction orthogonal to the first electrode pattern (an arrow B indicated by a chain double-dashed line in the figure). That is, the initial alignment of the first electrode pattern can be set arbitrarily within the range from the y-axis direction to a direction having the first angle θ1 with respect to the y-axis direction.

Specifically, an arrow C shown in FIG. 8 indicates the initial orientation direction of the second alignment film 130-2 with respect to the second electrode pattern of the second substrate 210-2. As shown by the arrow C, the initial alignment direction is parallel to the x-axis direction. In addition, the direction of the initial orientation can be arbitrarily set within the range from the x-axis direction to a direction orthogonal to the first electrode pattern (an arrow D indicated by a chain double-dashed line in the figure). That is, the initial alignment of the second electrode pattern can be set arbitrarily within the range from the x-axis direction to a direction having the second angle θ2 with respect to the x-axis direction.

In addition, the direction of the initial alignment shown in FIG. 8 is represented by the arrow A in the first electrode pattern and the arrow C in the second electrode pattern. However, needless to say, the direction of the initial alignment shown in FIG. 8 can be set within a direction orthogonal to the corresponding electrode pattern as described above.

The four liquid crystal cells 200 have a different first electrode pattern and second electrode pattern from each other. Specifically, the first angle θ1 or the second angle θ2 is different between the first liquid crystal cell 200-1, the second liquid crystal cell 200-2, the third liquid crystal cell 200-3, and the fourth liquid crystal cell 200-4. For example, when the first angle θ1 and the second angle θ2 are the same in each liquid crystal cell 200 (for example, when the first angle θ1 and the second angle θ2 are the same in the first liquid crystal cell 200-1), the first angles θ1 of the first liquid crystal cell 200-1, the second liquid crystal cell 200-2, the third liquid crystal cell 200-3, and the fourth liquid crystal cell 200-4 are −1 degree, +1 degree, +3 degrees, and −3 degrees, respectively. In this case, since the diffusion state in each liquid crystal cell 200 changes, it is possible to suppress the light intensity of a specific wavelength becoming stronger.

In addition, focusing on the initial alignment direction of the substrates of the four liquid crystal cells as shown in FIG. 7, the first substrate 210-1 of the first liquid crystal cell 200-1 and the first substrate 210-1 of the fourth liquid crystal cell 200-4 have the same initial alignment direction (the first alignment direction), the first substrate 210-1 of the second liquid crystal cell 200-2 and the first substrate 210-1 of the third liquid crystal cell 200-3 have the same initial alignment direction (the second alignment direction), and the second alignment direction is opposite to the first alignment direction. Further, the second substrate 210-2 of the first liquid crystal cell 200-1 and the second substrate 210-2 of the fourth liquid crystal cell 200-4 have the same initial alignment direction (the third alignment direction), the second substrate 210-2 of the second liquid crystal cell 200-2 and the second substrate 210-2 of the third liquid crystal cell 200-3 have the same initial alignment direction (the fourth alignment direction), and the fourth alignment direction is opposite to the third alignment direction. In this way, when the initial alignment direction is set in each substrate, the initial alignment direction is provided in a balanced manner when viewed in the entire optical element 20 and the left-right or up-down balance of light passing through the optical element 20 is also maintained.

As described above, in the optical element 20 according to an embodiment of the present invention, it is possible to suppress the light intensity of a specific wavelength becoming stronger. Therefore, uniform light distribution with suppressed coloring can be obtained in the optical element 20.

Modification 1 of Second Embodiment

An optical element 20A, which is a modified example of the optical element 20 according to an embodiment of the present invention, is described with reference to FIG. 9. Hereinafter, when a configuration of the optical element 20A is similar to the configuration of the optical element 20, the description of the configuration of the optical element 20A may be omitted.

Figure 9:
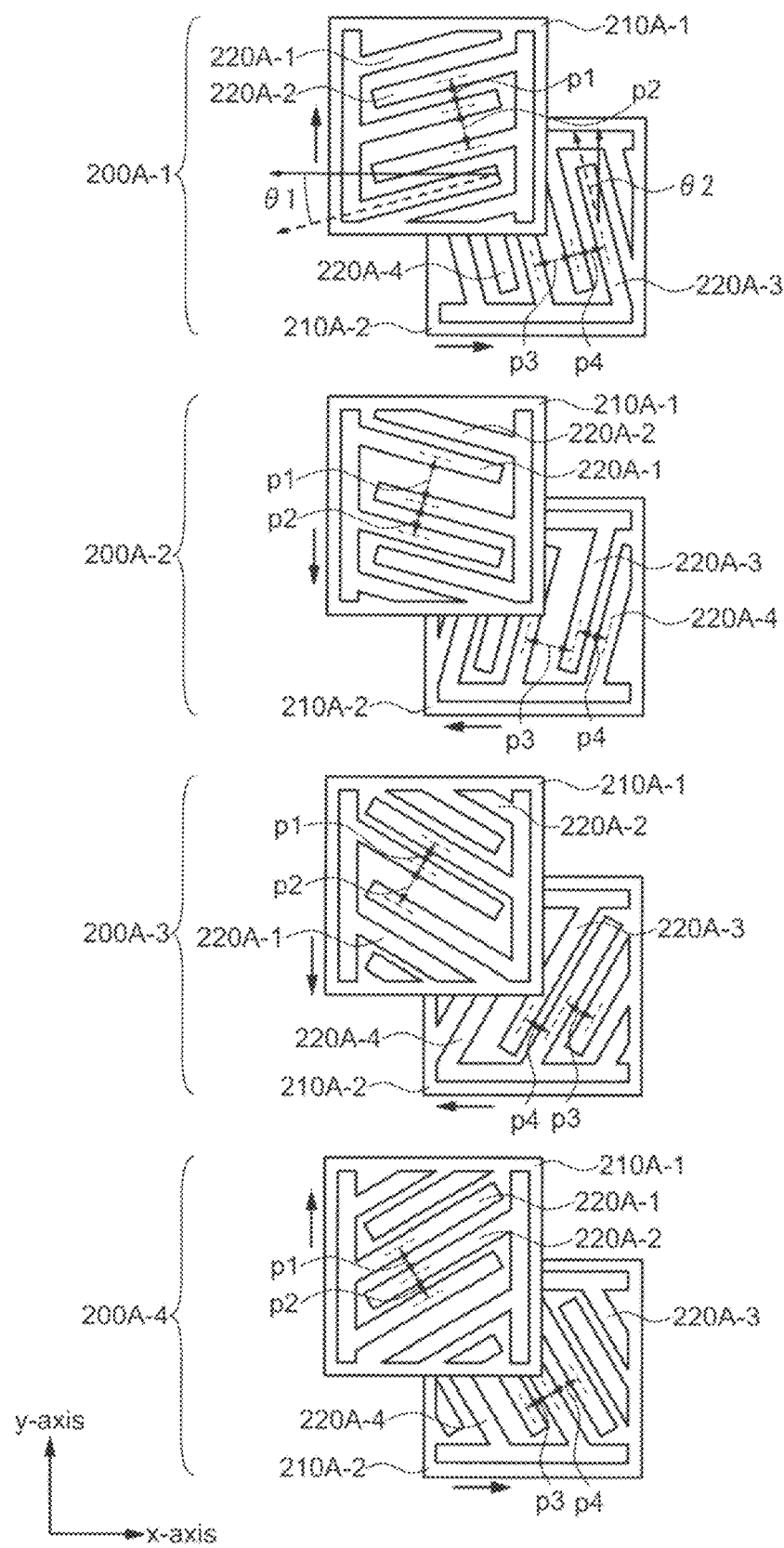
FIG. 9 is a schematic diagram illustrating a configuration of a transparent electrode of a liquid crystal cell of an optical element according to an embodiment of the present invention.

FIG. 9 is a schematic diagram illustrating a configuration of a transparent electrode 220A of a liquid crystal cell 200A of the optical element 20A according to an embodiment of the present invention. The optical element 20A includes four liquid crystal cells 200A. That is, in the optical element 20A, a first liquid crystal cell 200A-1, a second liquid crystal cell 200A-2, a third liquid crystal cell 200A-3, and a fourth liquid crystal cell 200A-4 are sequentially stacked. Each of the first liquid crystal cell 200A-1, the second liquid crystal cell 200A-2, the third liquid crystal cell 200A-3, and the fourth liquid crystal cell 200A-4 includes a first substrate 210A-1 provided with a first transparent electrode 220A-1 and a second transparent electrode 220A-2, and a second substrate 210A-2 provided with a third transparent electrode 220A-3 and a fourth transparent electrode 220A-4.

A first electrode pattern and a second electrode pattern for driving the liquid crystal are formed on the first substrate 210A-1 and the second substrate 210A-2, respectively. The first electrode pattern is a pattern in which the first transparent electrode 220A-1 and the second transparent electrode 220A-2 each extending in a direction having a first angle θ1 with respect to the x-axis direction are arranged alternately in the y-axis direction, and includes at least two inter-electrode pitches (see inter-electrode pitches p1 and p2 in FIG. 9) which are formed between the first transparent electrode 220A-1 and the second transparent electrode 220A-2. Further, the second electrode pattern is a pattern in which the third transparent electrode 220A-3 and the fourth transparent electrode 220A-4 each extending in a direction having a second angle θ2 with respect to the y-axis direction are alternately arranged in the x-axis direction, and includes at least two inter-electrode pitches (see inter-electrode pitches p3 and p4 in FIG. 9) which are formed between the third transparent electrode 220A-3 and the fourth transparent electrode 220A-4.

The four liquid crystal cells 200A have a different first electrode pattern and second electrode pattern from each other. Specifically, the different first angle θ1 and second angle θ2 are different between the first liquid crystal cell 200A-1, the second liquid crystal cell 200A-2, the third liquid crystal cell 200A-3, and the fourth liquid crystal cell 200A-4. For example, when the first angle θ1 and the second angle θ2 are the same in each liquid crystal cell 200A (for example, when the first angle θ1 and the second angle θ2 are the same in the first liquid crystal cell 200A-1), the first angles θ1 of the first liquid crystal cell 200A-1, the second liquid crystal cell 200A-2, the third liquid crystal cell 200A-3, and the fourth liquid crystal cell 200A-4 are −1 degree, +1 degree, +3 degrees, and −3 degrees, respectively. In this case, since the diffusion state in each liquid crystal cell 200A changes, it is possible to further suppress the light intensity of a specific wavelength becoming stronger.

In addition, the widths w1 of the plurality of comb-teeth shaped portions of the first transparent electrodes 220A-1 may be different from each other, or some of them may be the same. The widths w2 of the plurality of comb-teeth shaped portions of the second transparent electrodes 220A-2, the widths w3 of the plurality of comb-teeth shaped portions of the third transparent electrodes 220A-3, and the widths w4 of the plurality of comb-teeth shaped portions of the fourth transparent electrodes 220A-4 are the same configuration as the widths w1. Further, the distances between the adjacent first transparent electrode 120A-1 and second transparent electrode 120A-2 may be all the same, some of them may be the same, or all of them may be different from each other. When the width w1 of the comb-teeth shaped portion of the first transparent electrode 120A-1 is different from the width w2 of the comb-teeth shaped portion of the second transparent electrode 120A-2, and/or the distances between the comb-teeth shaped portion of the first transparent electrode 120A-1 and the comb-teeth shaped portion of the second transparent electrode 120A-2 are different from each other, unequal pitches are realized in the first electrode pattern. The second electrode pattern has the same configuration as the first electrode pattern.

As described above, in the optical element 20A according to an embodiment of the present invention, it is possible to suppress the light intensity of a specific wavelength becoming stronger. Therefore, uniform light distribution with suppressed coloring can be obtained in the optical element 20A.

Modification 2 of Second Embodiment

An optical element 20B, which is another modified example of the optical element 20 according to an embodiment of the present invention, is described with reference to FIG. 10. Hereinafter, when a configuration of the optical element 20B is similar to the configuration of the optical element 20 or the optical element 20A, the description of the configuration of the optical element 20B may be omitted.

Figure 10:
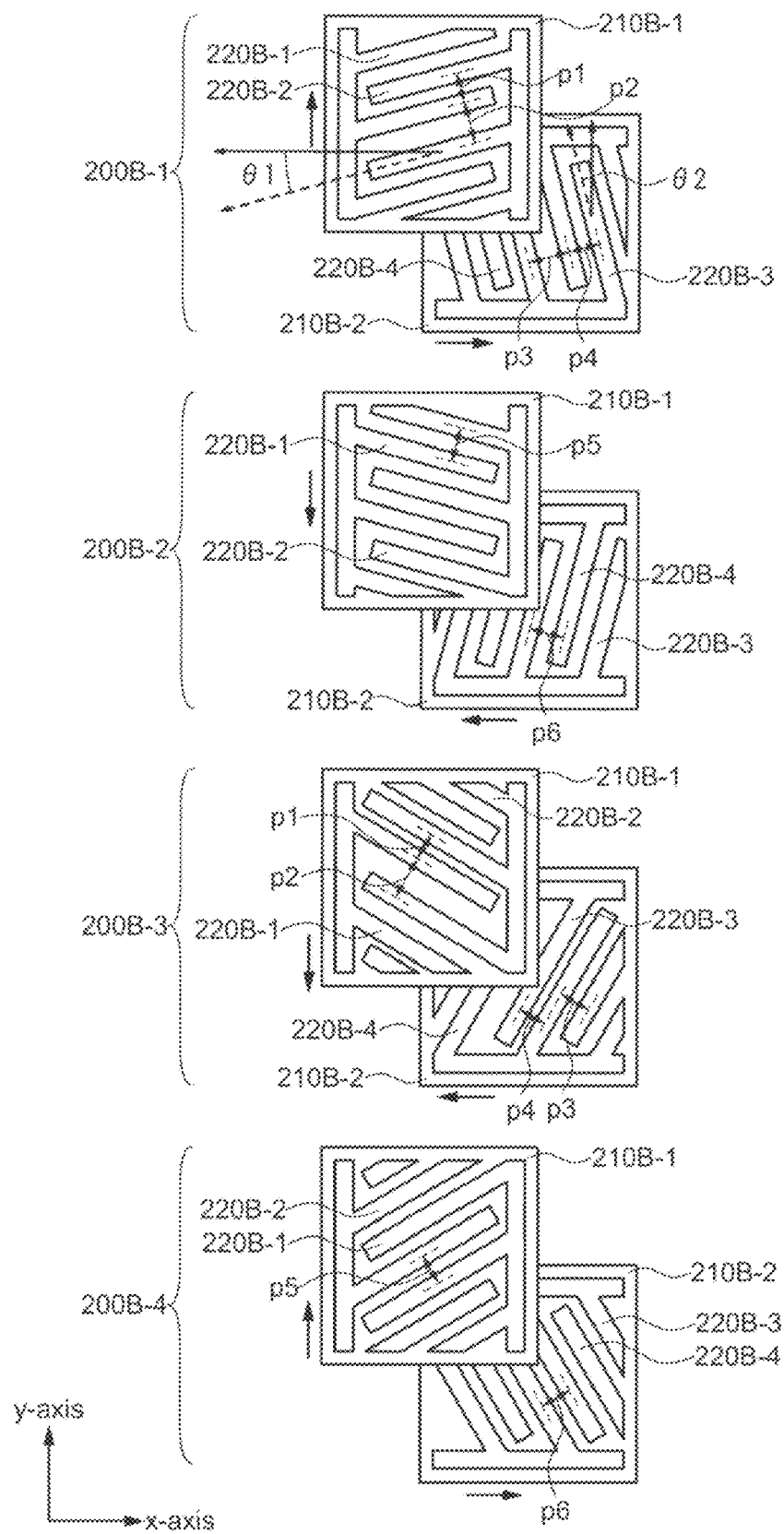
FIG. 10 is a schematic diagram illustrating a configuration of a transparent electrode of a liquid crystal cell of an optical element according to an embodiment of the present invention.

FIG. 10 is a schematic diagram illustrating a configuration of a transparent electrode 220B of a liquid crystal cell 200B of the optical element 20B according to an embodiment of the present invention. The optical element 20B includes four liquid crystal cells 200B. That is, in the optical element 20B, a first liquid crystal cell 200B-1, a second liquid crystal cell 200B-2, a third liquid crystal cell 200B-3, and a fourth liquid crystal cell 200B-4 are sequentially stacked. Each of the first liquid crystal cell 200B-1, the second liquid crystal cell 200B-2, the third liquid crystal cell 200B-3, and the fourth liquid crystal cell 200B-4 includes a first substrate 210B-1 provided with a first transparent electrode 220B-1 and a second transparent electrode 220B-1, and a second substrate 210B-2 provided with a third transparent electrode 220B-3 and a fourth transparent electrode 220B-4.

A first electrode pattern and a second electrode pattern for driving the liquid crystal are formed on the first substrate 210B-1 and the second substrate 210B-2, respectively. The first electrode pattern is a pattern in which the first transparent electrode 220B-1 and the second transparent electrode 220B-2 each extending in a direction having a first angle θ1 with respect to the x-axis direction are arranged alternately in the y-axis direction. The second electrode pattern is a pattern in which the third transparent electrodes 220B-3 and the fourth transparent electrode 220B-4 each extending in a direction having a second angle θ2 with respect to the y-axis direction are arranged alternately in the x-axis direction.

The first electrode pattern of each of the first liquid crystal cell 200B-1 and the third liquid crystal cell 200B-3 includes at least two inter-electrode pitches (see inter-electrode pitches p1 and p2 in FIG. 10) which are formed between the first transparent electrode 220B-1 and the second transparent electrode 220B-2. Further, the second electrode pattern of each of the first liquid crystal cell 200B-1 and the third liquid crystal cell 200B-3 includes at least two inter-electrode pitches (see inter-electrode pitches p3 and p4 in FIG. 10) which are formed between the third transparent electrode 220B-3 and the fourth transparent electrode 220B-4.

On the other hand, the first electrode pattern of each of the second liquid crystal cell 200B-2 and the fourth liquid crystal cell 200B-4 includes one inter-electrode pitch (see inter-electrode pitch p5 in FIG. 10) which is formed between the first transparent electrode 220B-1 and the second transparent electrode 220B-2. Further, the second electrode pattern of each of the second liquid crystal cell 200B-2 and the fourth liquid crystal cell 200B-4 includes one inter-electrode pitch (see inter-electrode pitch p6 in FIG. 10) which is formed between the third transparent electrode 220B-3 and the fourth transparent electrode 220B-4. That is, the electrode patterns of each of the second liquid crystal cell 200B-2 and the fourth liquid crystal cell 200B-4 have equal pitches. In addition, the inter-electrode pitch p5 of the first electrode pattern and the inter-electrode pitch p6 of the second electrode pattern may be the same or may be different from each other, in each of the second liquid crystal cell 200B-2 and the fourth liquid crystal cell 200B-4. Further, a configuration in which the second liquid crystal cell 300B-2 and the fourth crystal cell 300B-4 have the same inter-electrode pitch p5 of the first electrode pattern and the same inter-electrode pitch p6 of the second electrode pattern can also be adopted.

The first liquid crystal cell 200B-1, the second liquid crystal cell 200B-2, the third liquid crystal cell 200B-3, and the fourth liquid crystal cell 200B-4 have a different first angle θ1 and second angle θ2 from each other. For example, when the first angle θ1 and the second angle θ2 are the same in each liquid crystal cell 200B (for example, when the first angle θ1 and the second angle θ2 are the same in the first liquid crystal cell 200B-1), the first angles θ1 of the first liquid crystal cell 200B-1, the second liquid crystal cell 200B-2, the third liquid crystal cell 200B-3, and the fourth liquid crystal cell 200B-4 are −1 degree, +1 degree, +3 degrees, and −3 degrees, respectively. Therefore, even when the inter-electrode pitches of the second liquid crystal cell 200B-2 and the fourth liquid crystal cell 200B-4 are the same, the four liquid crystal cells 200B have a different first electrode pattern and the second electrode pattern from each other because the first angles θ1 are different between the four liquid crystal cells 200B. In this case, since the diffusion state in each liquid crystal cell 200B changes, it is possible to suppress the light intensity of a specific wavelength becoming stronger.

In addition, the widths w1 of the plurality of comb-teeth shaped portions of the first transparent electrodes 220B-1 in each of the first liquid crystal cell 200B-1 and the third liquid crystal cell 200B-3 may be different from each other, or some of them may be the same. The widths w2 of the plurality of comb-teeth shaped portions of the second transparent electrode 220B-2, the widths w3 of the plurality of comb-teeth shaped portions of the third transparent electrodes 220B-3, and the widths w4 of the plurality of comb-teeth shaped portions of the fourth transparent electrodes 220B-4 in each of the first liquid crystal cell 200B-1 and the third liquid crystal cell 200B-3 have the same configuration as the widths w1. Further, the distances between the adjacent first transparent electrode 220B-1 and second transparent electrode 220B-2 may be all the same, some of them may be the same, or all of them may be different from each other, in the first liquid crystal cell 200B-1 and the third liquid crystal cell 200B-3. When the width w1 of the comb-teeth shaped portion of the first transparent electrode 220B-1 is different from the width w2 of the comb-teeth shaped portion of the second transparent electrode 220B-2, and/or the distances between the comb-teeth shaped portion of the first transparent electrode 220B-1 and the comb-teeth shaped portion of the second transparent electrode 220B-2 are different from each other, unequal pitches are realized in the first electrode pattern. The second electrode pattern has the same configuration as the first electrode pattern.

The optical element 20B described above has a configuration in which each electrode pattern of the first liquid crystal cell 200B-1 and the third liquid crystal cell 200B-3 has an unequal pitch, and each electrode pattern of the second liquid crystal cell 200B-2 and the fourth liquid crystal cell 200B-4 has an equal pitch. However, a configuration in which each electrode pattern of the first liquid crystal cell 200B-1 and the third liquid crystal cell 200B-3 has an equal pitch, and each electrode pattern of the second liquid crystal cell 200B-2 and the fourth liquid crystal cell 200B-4 has an unequal pitch can also be adopted in the optical element 20B. Further, a configuration in which each electrode pattern of the first liquid crystal cell 200B-1 and the fourth liquid crystal cell 200B-4 has an unequal pitch, and each electrode pattern of the second liquid crystal cell 200B-2 and the third liquid crystal cell 200B-3 has an equal pitch can also be adopted in the optical element 20B. Furthermore, a configuration in which each electrode pattern of one or three of the four liquid crystal cells 200B has an unequal pitch and each electrode pattern of the other three or one has an equal pitch, or vice versa can also be adopted in the optical element 20B.

As described above, in the optical element 20B according to an embodiment of the present invention, it is possible to suppress the light intensity of a specific wavelength becoming stronger. Therefore, uniform light distribution with suppressed coloring can be obtained in the optical element 20B.

Third Embodiment

An optical element 30 according to an embodiment of the present invention is described with reference to FIGS. 11 and 12. Hereinafter, when a configuration of the optical element 30 is similar to the configuration of the optical element 10 or the optical element 20, the description of the configuration of the optical element 30 may be omitted.

Figure 11:
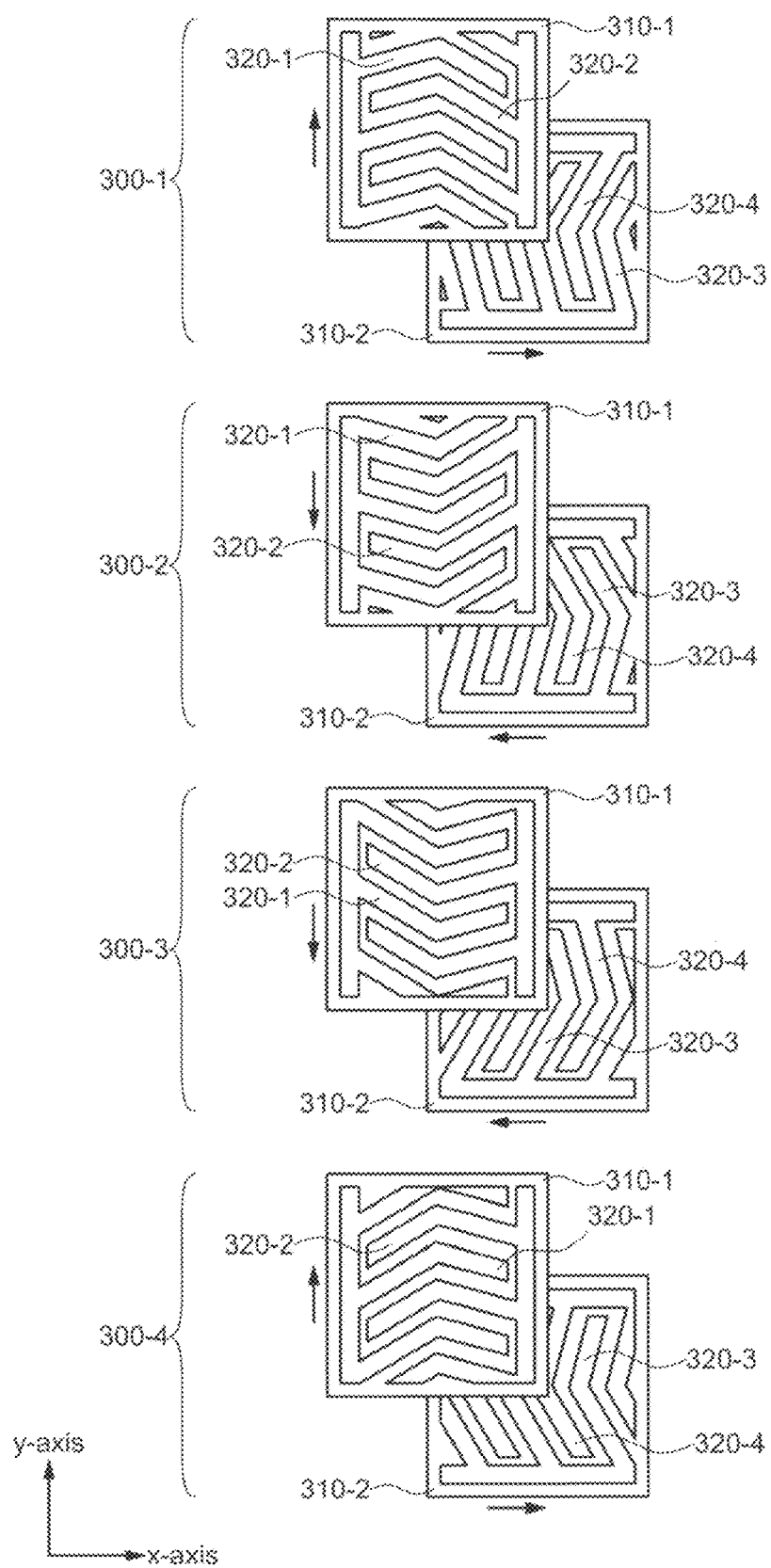
FIG. 11 is a schematic diagram illustrating a configuration of a transparent electrode of a liquid crystal cell of an optical element according to an embodiment of the present invention.

FIG. 11 is a schematic diagram illustrating a configuration of a transparent electrode 320 of a liquid crystal cell 300 of the optical element 30 according to an embodiment of the present invention. The optical element 30 includes four liquid crystal cells 300. That is, in the optical element 30, a first liquid crystal cell 300-1, a second liquid crystal cell 300-2, a third liquid crystal cell 300-3, and a fourth liquid crystal cell 300-4 are sequentially stacked. Each of the first liquid crystal cell 300-1, the second liquid crystal cell 300-2, the third liquid crystal cell 300-3, and the fourth liquid crystal cell 300-4 includes a first substrate provided with a first transparent electrode 320-1 and a second transparent electrode 320-2, and a second substrate 310-2 provided with a third transparent electrode 320-3 and a fourth transparent electrode 320-4.

A first electrode pattern and a second electrode pattern for driving the liquid crystal are formed on the first substrate 310-1 and the second substrate 310-2, respectively. Here, the first electrode pattern and the second electrode pattern of the liquid crystal cell 300 are described in detail with reference to FIG. 12.

Figure 12:
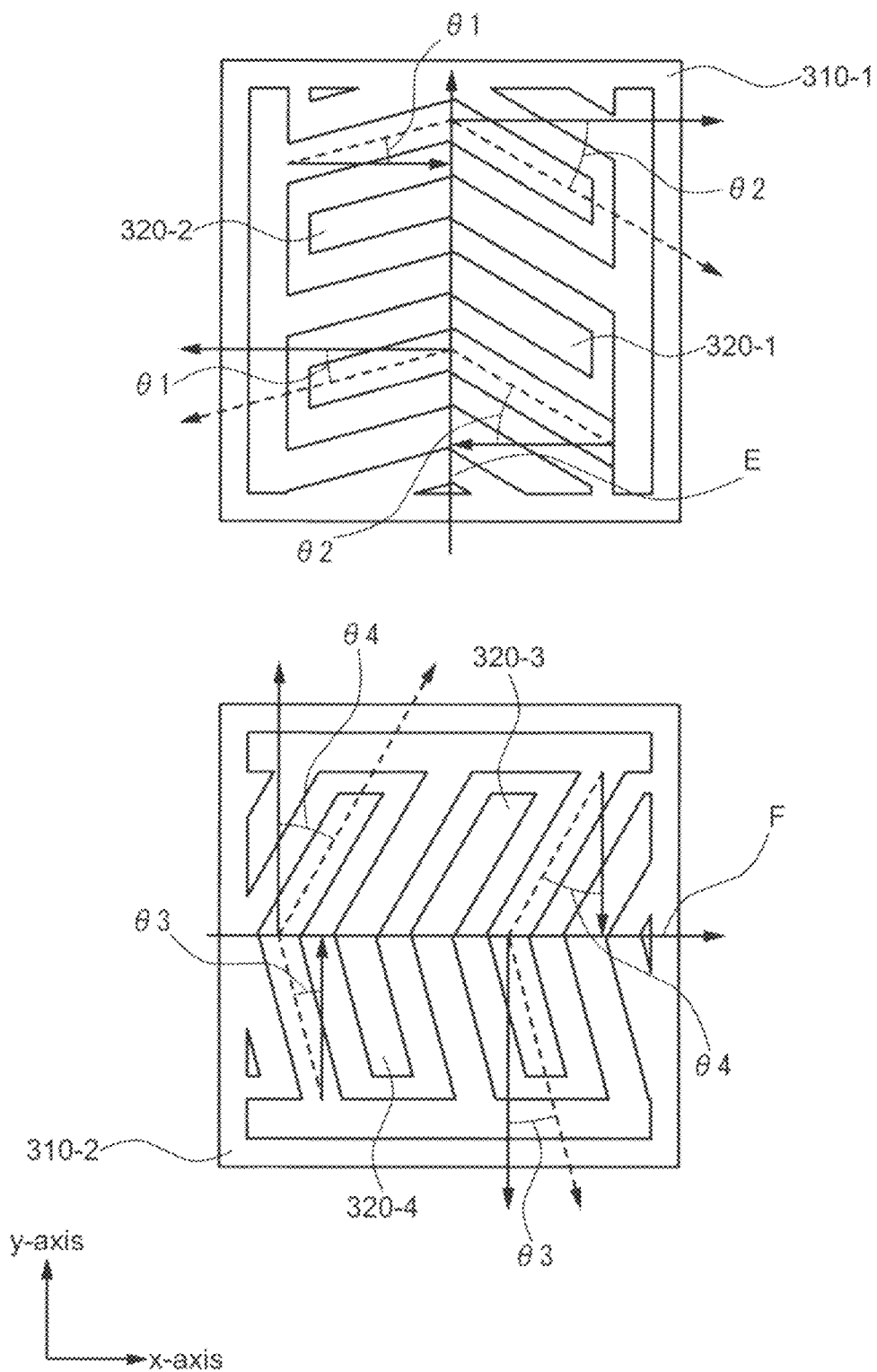
FIG. 12 is a schematic diagram illustrating configurations of a first electrode pattern and a second electrode pattern of a liquid crystal cell of an optical element according to an embodiment of the present invention.

FIG. 12 is a schematic diagram illustrating configurations of the first electrode pattern and the second electrode pattern of the liquid crystal cell 300 of the optical element 30 according to an embodiment of the present invention. The first electrode pattern is a pattern in which the first transparent electrode 320-1 and the second transparent electrodes 320-2 each having a bent shape (a dogleg shape) are alternately arranged in the y-axis direction. Specifically, the first transparent electrode 320-1 extends in a direction having a first angle θ1 with respect to the x-axis direction, and is bent in a direction having a second angle θ2 with respect to the x-axis direction. The second transparent electrode 320-2 extends in a direction having the second angle θ2 with respect to the x-axis direction, and is bent in a direction having the first angle θ1 with respect to the x-axis direction. Further, the second electrode pattern is a pattern in which the third transparent electrode 320-3 and the fourth transparent electrode 320-4 each having a bent shape (a dogleg shape) are alternately arranged in the x-axis direction. Specifically, the third transparent electrode 320-3 extends in a direction having a third angle θ3 with respect to the y-axis direction, and is bent in a direction having a fourth angle θ4 with respect to the y-axis direction. The fourth transparent electrode 320-4 extends in a direction having the fourth angle θ4 with respect to the y-axis direction, and is bent in a direction having the third angle θ3 with respect to the y-axis direction.

The first angle θ1 may be the same as the third angle θ3 or may be different from the third angle θ3. Further, the second angle θ2 may be the same as the fourth angle θ4 or may be different from the fourth angle θ4. In addition, since the transparent electrode 320 has the bent shape, the first angle θ1 and the second angle θ2 have opposite signs, and the third angle θ3 and the fourth angle θ4 have opposite signs. Each of the first angle θ1, the second angle θ2, the third angle θ3, and the fourth angle θ4 is greater than or equal to −5 degrees and less than or equal to +5 degrees, preferably greater than or equal to −3 degrees and less than or equal to +3 degrees. In addition, although there are differences in the first angle θ1, the second angle θ2, the third angle θ3, and the fourth angle θ4, the four liquid crystal cells 300 have basically the same extending directions of the first transparent electrode 320-1, the second transparent electrode 320-2, the third transparent electrode 320-3, and the fourth transparent electrode 320-4. That is, the optical element 30 is not configured such that two of the four liquid crystal cells 300 have to be rotated by 90 degrees with respect to the other two liquid crystal cells 300. The optical element 30 has a structure in which the four liquid crystal cells 300 are stacked, independent of the rotation of each liquid crystal cell 300.

Further, an arrow E shown in FIG. 12 indicates the initial orientation direction of the alignment film with respect to the first electrode pattern of the first substrate 310-1. As shown by the arrow E, the initial orientation direction is parallel to the y-axis direction.

Similarly, an arrow F shown in FIG. 12 indicates the initial orientation direction of the alignment film with respect to the second electrode pattern of the second substrate 310-2. As shown by the arrow F, the initial orientation direction is parallel to the x-axis direction.

The four liquid crystal cells 300 have a different first electrode pattern and second electrode pattern from each other. Specifically, at least one of the first angle θ1 and the second angle θ2 are different between the first liquid crystal cell 300-1, the second liquid crystal cell 300-2, the third liquid crystal cell 300-3, and the fourth liquid crystal cell 300-4. For example, when the first angle θ1 and the second angle θ2 are the same as the third angle θ3 and the fourth angle θ4, respectively, in each liquid crystal cell 300 (for example, the first angle θ1 and the second angle θ2 are the same as the third angle θ3 and the fourth angle θ4, respectively, in the first liquid crystal cell 300-1), (first angles θ1, second angles θ2) of the first liquid crystal cell 300-1, the second liquid crystal cell 300-2, the third liquid crystal cell 300-3, and the fourth liquid crystal cell 300-4 are (−1 degree, +3 degrees), (+1 degree, −3 degrees), (+3 degrees, −1 degree), and (−3 degrees, +1 degree), respectively. In this case, since the diffusion state in each liquid crystal cell 300 changes, it is possible to suppress the light intensity of a specific wavelength becoming stronger. Further, since the transparent electrode 320 has the bent shape, it is possible to prevent the transparent electrodes 320 overlapping with periodicity.

As described above, in the optical element 30 according to an embodiment of the present invention, it is possible to prevent the transparent electrodes 320 overlapping with periodicity, and suppress the light intensity of a specific wavelength becoming stronger. Therefore, uniform light distribution with suppressed moiré and coloring can be obtained in the optical element 30.

Modification 1 of Third Embodiment

An optical element 30A, which is a modified example of the optical element 30 according to an embodiment of the present invention, is described with reference to FIG. 13. Hereinafter, when a configuration of the optical element 30A is similar to the configuration of the optical element 30, the description of the configuration of the optical element 30A may be omitted.

Figure 13:
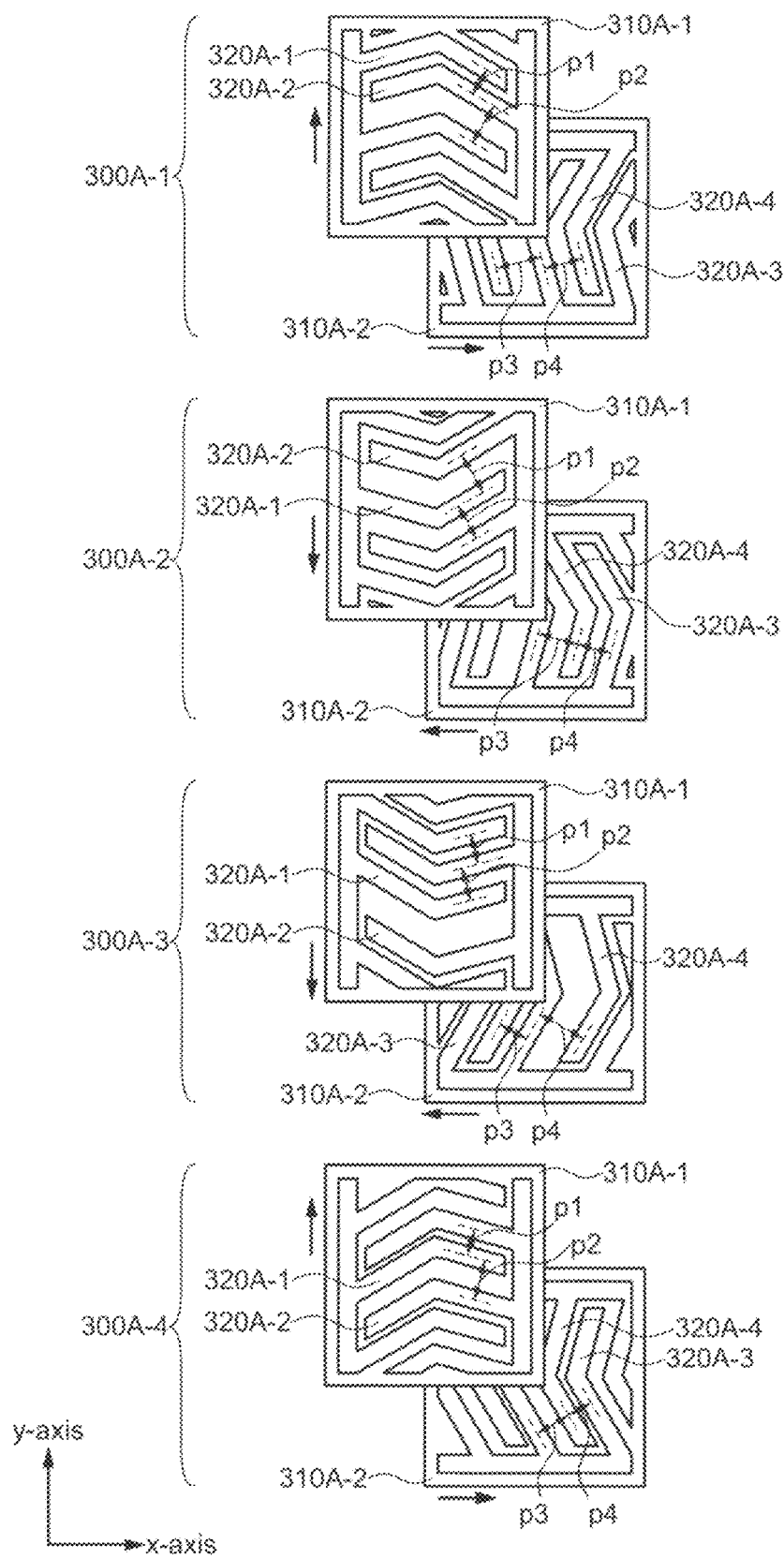
FIG. 13 is a schematic diagram illustrating a configuration of a transparent electrode of a liquid crystal cell of an optical element according to an embodiment of the present invention.

FIG. 13 is a schematic diagram illustrating a configuration of a transparent electrode 320A of a liquid crystal cell 300A of the optical element 30A according to an embodiment of the present invention. The optical element 30A includes four liquid crystal cells 300A. That is, in the optical element 30A, a first liquid crystal cell 300A-1, a second liquid crystal cell 300A-2, a third liquid crystal cell 300A-3, and a fourth liquid crystal cell 300A-4 are sequentially stacked. Each of the first liquid crystal cell 300A-1, the second liquid crystal cell 300A-2, the third liquid crystal cell 300A-3, and the fourth liquid crystal cell 300A-4 includes a first substrate 310A-1 provided with a first transparent electrode 320A-1 and a second transparent electrode 320A-2, and a second substrate 310A-2 provided with a third transparent electrode 320A-3 and a fourth transparent electrode 320A-4.

A first electrode pattern and a second electrode pattern for driving the liquid crystal are formed on the first substrate 310A-1 and the second substrate 310A-2, respectively. The first electrode pattern is a pattern in which the first transparent electrode 320A-1 and the second transparent electrode 320A-2 each having a bent shape (a dogleg shape) are alternately arranged in the y-axis direction, and includes at least two inter-electrode pitches (see inter-electrode pitches p1 and p2 in FIG. 13) which are formed between the first transparent electrode 320A-1 and the second transparent electrode 320A-2. Further, the second electrode pattern is a pattern in which the third transparent electrode 320A-3 and the fourth transparent electrode 320A-2 each having a bent shape (a dogleg shape) are alternately arranged in the x-axis direction, and includes at least two inter-electrode pitches (see inter-electrode pitches p3 and p4 in FIG. 13) which are formed between the third transparent electrode 320A-3 and the fourth transparent electrode 320A-4.

The four liquid crystal cells 300A have a different first electrode pattern and second electrode pattern from each other. Specifically, at least one of the first angle θ1 and the second angle θ2 are different between the first liquid crystal cell 300A-1, the second liquid crystal cell 300A-2, the third liquid crystal cell 300A-3, and the fourth liquid crystal cell 300A-4. For example, when the first angle θ1 and the second angle θ2 are the same as the third angle θ3 and the fourth angle θ4, respectively, in each liquid crystal cell 300 (for example, the first angle θ1 and the second angle θ2 are the same as the third angle θ3 and the fourth angle θ4, respectively, in the first liquid crystal cell 300A-1), (first angles θ1, second angles θ2) of the first liquid crystal cell 300A-1, the second liquid crystal cell 300A-2, the third liquid crystal cell 300A-3 and the fourth liquid crystal cell 300A-4 are (−1 degree, +3 degrees), (+1 degree, −3 degrees), (+3 degrees, −1 degree), and (−3 degrees, +1 degree), respectively. In this case, since the diffusion state in each liquid crystal cell 300A changes, it is possible to suppress the light intensity of a specific wavelength becoming stronger. Further, since the transparent electrode 320A has the bent shape, it is possible to prevent the transparent electrodes 320A overlapping with periodicity.

In addition, the widths w1 of the plurality of comb-teeth shaped portions of the first transparent electrodes 320A-1 may be different from each other, or some of them may be the same. The widths w2 of the plurality of comb-teeth shaped portions of the second transparent electrodes 320A-2, the widths w3 of the plurality of comb-teeth shaped portions of the third transparent electrodes 320A-3, and the widths w4 of the plurality of comb-teeth shaped portions of the fourth transparent electrodes 320A-4 have the same configuration as the widths w1. Further, the distances between the adjacent first transparent electrode 320A-1 and second transparent electrode 320A-2 may be all the same, some of them may be the same, or all of them may be different from each other. When the width w1 of the comb-teeth shaped portion of the first transparent electrode 320A-1 is different from the width w2 of the comb-teeth shaped portion of the second transparent electrode 320B-2, and/or the distances of the comb-teeth shaped portions between the first transparent electrode 320B-1 and the second transparent electrode 320A-2 are different from each other, unequal pitches are realized in the first electrode pattern. The second electrode pattern has the same configuration as the first electrode pattern.

As described above, in the optical element 30A according to an embodiment of the present invention, it is possible to prevent the transparent electrodes 320A overlapping with periodicity, and suppress the light intensity of a specific wavelength becoming stronger. Therefore, uniform light distribution with suppressed moiré and coloring can be obtained in the optical element 30A.

Modification 2 of Third Embodiment

An optical element 30B, which is another modified example of the optical element 30 according to an embodiment of the present invention, is described with reference to FIG. 14. Hereinafter, when a configuration of optical element 30B is similar to the configuration of the optical element 30 or the optical element 30A, the description of the configuration of the optical element 30B may be omitted.

Figure 14:
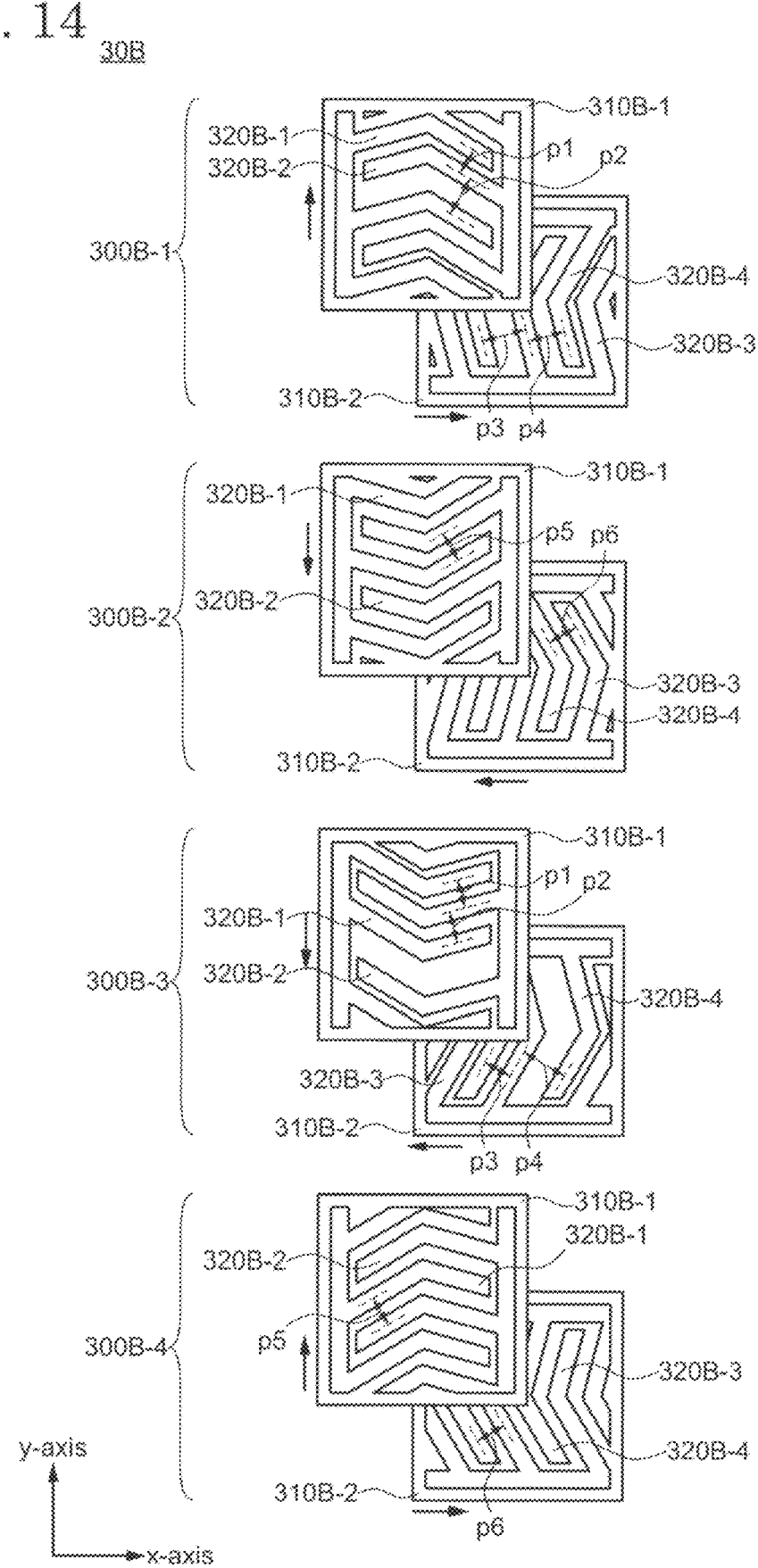
FIG. 14 is a schematic diagram illustrating a configuration of a transparent electrode of a liquid crystal cell of an optical element according to an embodiment of the present invention.

FIG. 14 is a schematic diagram illustrating a configuration of a transparent electrode 320B of a liquid crystal cell 300B of the optical element 30B according to an embodiment of the present invention. The optical element 30B includes four liquid crystal cells 300B. That is, in the optical element 30B, a first liquid crystal cell 300B-1, a second liquid crystal cell 300B-2, a third liquid crystal cell 300B-3, and a fourth liquid crystal cell 300B-4 are sequentially stacked. Each of the first liquid crystal cell 300B-1, the second liquid crystal cell 300B-2, the third liquid crystal cell 300B-3, and the fourth liquid crystal cell 300B-4 includes a first substrate 310B-1 provided with a first transparent electrode 320B-1 and a second transparent electrode 320B-2, and a second substrate 310B-2 provided with a third transparent electrode 320B-3 and a fourth transparent electrode 320B-4.

A first electrode pattern and a second electrode pattern for driving the liquid crystal are formed on the first substrate 310B-1 and the second substrate 310B-2, respectively. The first electrode pattern is a pattern in which the first transparent electrode 320B-1 and the second transparent electrode 320B-2 each having a bent shape (a dogleg shape) are alternately arranged in the y-axis direction. Further, the second electrode pattern is a pattern in which the third transparent electrode 320B-3 and the fourth transparent electrode 320B-4 each having a bent shape (a dogleg shape) are alternately arranged in the x-axis direction.

The first electrode pattern of each of the first liquid crystal cell 300B-1 and the third liquid crystal cell 300B-3 has at least two inter-electrode pitches (inter-electrode pitches p1 and p2 in FIG. 14) which are formed between the first transparent electrode 320B-1 and the second transparent electrode 320B-2. Further, the second electrode pattern of each of the first liquid crystal cell 300B-1 and the third liquid crystal cell 300B-3 has at least two inter-electrode pitches (inter-electrode pitches p3 and p4 in FIG. 14) which are formed between the third transparent electrode 320B-3 and the fourth transparent electrode 320B-4.

On the other hand, the first electrode pattern of each of the second liquid crystal cell 300B-2 and the fourth liquid crystal cell 300B-4 includes one inter-electrode pitch (inter-electrode pitch p5 in FIG. 14) which is formed between the first transparent electrode 320B-1 and the second transparent electrode 320B-2. Further, the second electrode pattern of each of the second liquid crystal cell 300B-2 and the fourth liquid crystal cell 200B-4 includes one inter-electrode pitch (inter-electrode pitch p6 in FIG. 14) which is formed between the third transparent electrode 320B-3 and the fourth transparent electrode 320B-4. That is, each electrode pattern of each of the second liquid crystal cell 300B-2 and the fourth liquid crystal cell 300B-4 has an equal pitch. In addition, the inter-electrode pitch p5 of the first electrode pattern and the inter-electrode pitch p6 of the second electrode pattern may be the same or may be different from each other, in each of the second liquid crystal cell 300B-2 and the fourth liquid crystal cell 300B-4. Further, a configuration in which the second liquid crystal cell 300B-2 and the fourth liquid crystal cell 300B-4 have the same inter-electrode pitch p5 of the first electrode pattern and the same inter-electrode pitch p6 of the second electrode pattern can also be adopted.

At least one of the first angle θ1 and the second angle θ2 are different between the first liquid crystal cell 300B-1, the second liquid crystal cell 300B-2, the third liquid crystal cell 300B-3, and the fourth liquid crystal cell 300B-4. For example, when the first angle θ1 and the second angle θ2 are the same as the third angle θ3 and the fourth angle θ4, respectively, in each liquid crystal cell 300 (for example, the first angle θ1 and the second angle θ2 are the same as the third angle θ3 and the fourth angle θ4, respectively, in the first liquid crystal cell 300A-1), (first angles θ1, second angles θ2) of the first liquid crystal cell 300B-1, the second liquid crystal cell 300B-2, the third liquid crystal cell 300B-3 and the fourth liquid crystal cell 300B-4 are (−1 degree, +3 degrees), (+1 degree, −3 degrees), (+3 degrees, −1 degree), and (−3 degrees, +1 degree), respectively. In this case, since the diffusion state in each liquid crystal cell 300B changes, it is possible to suppress the light intensity of a specific wavelength becoming stronger. Further, since the transparent electrode 320B has the bent shape, it is possible to prevent the transparent electrodes 320B overlapping with periodicity.

In addition, the widths w1 of the plurality of comb-teeth shaped portions of the first transparent electrodes 320B-1 in each of the first liquid crystal cell 300B-1 and the third liquid crystal cell 300B-3 may be different from each other, or some of them may be the same. The widths w2 of the plurality of comb-teeth shaped portions of the second transparent electrode 320B-2, the widths w3 of the plurality of comb-teeth shaped portions of the third transparent electrodes 320B-3, and the widths w4 of the plurality of comb-teeth shaped portions of the fourth transparent electrodes 320B-4 in each of the first liquid crystal cell 300B-1 and the third liquid crystal cell 300B-3 have the same configuration as the widths w1. Further, the distances between the adjacent first transparent electrode 320B-1 and second transparent electrode 320A-2 may be all the same, some of them may be the same, or all of them may be different from each other, in the first liquid crystal cell 300B-1 and the third liquid crystal cell 300B-3. When the width w1 of the comb-teeth shaped portion of the first transparent electrode 320B-1 is different from the width w2 of the comb-teeth shaped portion of the second transparent electrode 320B-2, and/or the distances between the comb-teeth shaped portion of the first transparent electrode 320B-1 and the comb-teeth shaped portion of the second transparent electrode 320B-2 are different from each other, unequal pitches are realized in the first electrode pattern. The second electrode pattern has the same configuration as the first electrode pattern.

The optical element 30B described above has a configuration in which each electrode pattern of the first liquid crystal cell 300B-1 and the third liquid crystal cell 300B-3 has an unequal pitch, and each electrode pattern of the second liquid crystal cell 300B-2 and the fourth liquid crystal cell 200B-4 has an equal pitch. However, a configuration in which each electrode pattern of the first liquid crystal cell 300B-1 and the third liquid crystal cell 300B-3 has an equal pitch, and each electrode pattern of the second liquid crystal cell 200B-2 and the fourth liquid crystal cell 200B-4 has an unequal pitch can also be adopted in the optical element 30B. Further, a configuration in which each electrode pattern of the first liquid crystal cell 300B-1 and the fourth liquid crystal cell 300B-4 has an unequal pitch, and each electrode pattern of the second liquid crystal cell 300B-2 and the third liquid crystal cell 300B-3 has an equal pitch can also be adopted in the optical element 30B. Furthermore, a configuration in which each electrode pattern of one or three of the four liquid crystal cells 300B has an unequal pitch and each electrode pattern of the other three or one has an equal pitch, or vice versa can also be adopted in the optical element 30B.

As described above, in the optical element 30B according to an embodiment of the present invention, it is possible to prevent the transparent electrodes 320B overlapping with periodicity, and suppress the light intensity of a specific wavelength becoming stronger. Therefore, uniform light distribution with suppressed moiré and coloring can be obtained in the optical element 30A.

Within the scope of the present invention, those skilled in the art may conceive of examples of changes and modifications, and it is understood that these examples of changes and modifications are also included within the scope of the present invention. For example, additions, deletions, or design changes of constituent elements, or additions, omissions, or changes to conditions of steps as appropriate based on the respective embodiments described above are also included within the scope of the present invention as long as the gist of the present invention is provided.

Further, other effects which differ from those brought about by the embodiment, but which are apparent from the description herein or which can be readily predicted by those skilled in the art, are naturally understood to be brought about by the present invention.

What is claimed is:

1. An optical element comprising a first liquid crystal cell, a second liquid crystal cell, a third liquid crystal cell, and a fourth liquid crystal cell stacked in sequence, the first liquid crystal cell, the second liquid crystal cell, the third liquid crystal cell, and the fourth liquid crystal cell each comprising:
    a first substrate on which a first transparent electrode and a second transparent electrode each extending in a direction having a first angle with respect to a first direction are alternately arranged in a second direction orthogonal to the first direction;
    a second substrate on which a third transparent electrode and a fourth transparent electrode each extending in a direction having a second angle with respect to the second direction are alternately arranged in the first direction; and
    a liquid crystal layer between the first substrate and the second substrate,
    wherein the first angle is different from the second angle.

2. The optical element according to claim 1, wherein the first angles of the first liquid crystal cell, the second liquid crystal cell, the third liquid crystal cell, and the fourth liquid crystal cell are different from each other.

3. The optical element according to claim 1,
    wherein in at least two liquid crystal cells of the first liquid crystal cell, the second liquid crystal cell, the third liquid crystal cell, and the fourth liquid crystal cell,
        the first transparent electrode and the second transparent electrode are arranged to have at least two different inter-electrode pitches, and
        the third transparent electrode and the fourth transparent electrode are arranged to have at least two different inter-electrode pitches.

4. The optical element according to claim 3, wherein the at least two liquid crystal cells comprise the second liquid crystal cell and the fourth liquid crystal cell.

5. An optical element comprising a first liquid crystal cell, a second liquid crystal cell, a third liquid crystal cell, and a fourth liquid crystal cell stacked in sequence, the first liquid crystal cell, the second liquid crystal cell, the third liquid crystal cell, and the fourth liquid crystal cell each comprising:
    a first substrate on which a first transparent electrode extending in a direction having a first angle with respect to a first direction and bent in a direction having a second angle with respect to the first direction and a second transparent electrode extending in the direction having the second angle with respect to the first direction and bent in the direction having the first angle with respect to the first direction are alternatively arranged in a second direction orthogonal to the first direction;
    a second substrate on which a third transparent electrode extending in a direction having a third angle with respect to the second direction and bent in a direction having a fourth angle with respect to the second direction and a fourth transparent electrode extending in the direction having the fourth angle with respect to the second direction and bent in the direction having the third angle with respect to the second direction are alternatively arranged in the first direction; and
    a liquid crystal layer between the first substrate and the second substrate.

6. The optical element according to claim 5,
    wherein the first angle is a same as the third angle, and the second angle is a same as the fourth angle.

7. The optical element according to claim 5,
    wherein the first angle is different from the third angle, and
    the second angle is different from the fourth angle.

8. The optical element according to claim 5,
    wherein the first angles of the first liquid crystal cell, the second liquid crystal cell, the third liquid crystal cell, and the fourth liquid crystal cell are different from each other, and
    the second angles of the first liquid crystal cell, the second liquid crystal cell, the third liquid crystal cell, and the fourth liquid crystal cell are different from each other.

9. The optical element according to claim 5,
    wherein in at least two liquid crystal cells of the first liquid crystal cell, the second liquid crystal cell, the third liquid crystal cell, and the fourth liquid crystal cell, the first transparent electrode and the second transparent electrode are arranged to have at least two different inter-electrode pitches, and the third transparent electrode and the fourth transparent electrode are arranged to have at least two different inter-electrode pitches.

10. The optical element according to claim 9, wherein the at least two liquid crystal cells comprise the second liquid crystal cell and the fourth liquid crystal cell.

* * * * *